United States Patent
Lee et al.

(10) Patent No.: US 10,829,621 B2
(45) Date of Patent: Nov. 10, 2020

(54) EDIBLE WATER-SOLUBLE FILM

(71) Applicant: Monosol, LLC, Merrillville, IN (US)

(72) Inventors: David M. Lee, Crown Point, IN (US); Jennifer L. Childers, Lowell, IN (US)

(73) Assignee: MONOSOL, LLC, Merrillville, IN (US)

( * ) Notice: Subject to any disclaimer, the term of this patent is extended or adjusted under 35 U.S.C. 154(b) by 0 days.

(21) Appl. No.: 13/740,053

(22) Filed: Jan. 11, 2013

(65) Prior Publication Data
US 2014/0199460 A1 Jul. 17, 2014

(51) Int. Cl.
| | |
|---|---|
| C08L 1/28 | (2006.01) |
| C08J 5/18 | (2006.01) |
| A23L 27/30 | (2016.01) |
| A23P 20/20 | (2016.01) |
| A23L 29/262 | (2016.01) |
| A23L 29/288 | (2016.01) |
| C08K 5/053 | (2006.01) |
| C08L 29/04 | (2006.01) |
| C08K 5/1575 | (2006.01) |

(52) U.S. Cl.
CPC .............. C08L 1/286 (2013.01); A23L 27/34 (2016.08); A23L 29/262 (2016.08); A23L 29/288 (2016.08); A23P 20/20 (2016.08); C08J 5/18 (2013.01); C08K 5/053 (2013.01); C08K 5/1575 (2013.01); C08L 29/04 (2013.01); *C08J 2329/04* (2013.01)

(58) Field of Classification Search
CPC ... C08L 1/286; C08L 29/04; C08J 5/18; C08J 2329/04; C08K 5/053; C08K 5/1575; A23P 20/20; A23L 29/262; A23L 29/288; A23L 27/34
See application file for complete search history.

(56) References Cited

U.S. PATENT DOCUMENTS

| | | | |
|---|---|---|---|
| 3,949,103 | A | 4/1976 | Glicksman |
| 4,851,394 | A | 7/1989 | Kubodera |
| 5,102,950 | A | 4/1992 | Terada et al. |
| 5,124,162 | A | 6/1992 | Boskovic et al. |
| 5,236,721 | A | 8/1993 | Yung Chu et al. |
| 5,470,581 | A | 11/1995 | Grillo et al. |

(Continued)

FOREIGN PATENT DOCUMENTS

| | | |
|---|---|---|
| CA | 2007522 A1 | 1/1991 |
| CA | 2295243 A1 | 7/2000 |

(Continued)

OTHER PUBLICATIONS

Chinese Patent Application No. 201480014218.0, Notification of the First Office Action (English translation), dated Jun. 13, 2018.

(Continued)

*Primary Examiner* — Subbalakshmi Prakash
(74) *Attorney, Agent, or Firm* — Marshall, Gerstein & Borun LLP

(57) ABSTRACT

Disclosed herein are water-soluble films and resulting packets including a water soluble film, wherein the water-soluble film includes a water-soluble mixture of polyvinyl alcohol, a compatibilizing agent, and a sugar alcohol plasticizer that is a solid at room temperature, wherein the water-soluble film is substantially transparent.

29 Claims, 4 Drawing Sheets

The Mylar template has five 1"x1" squares which designate the five sampling areas.

Each of the templates marginal squares are ½" inch from the edges and the center square is centered 2" inches from each edge.

(56) References Cited

U.S. PATENT DOCUMENTS

| | | | |
|---|---|---|---|
| 5,527,557 | A | 6/1996 | Rebstock et al. |
| 6,165,529 | A | 12/2000 | Yang et al. |
| 6,231,957 | B1 | 5/2001 | Zerbe et al. |
| 6,608,121 | B2 | 8/2003 | Isozaki et al. |
| 6,787,512 | B1 | 9/2004 | Verrall et al. |
| 6,846,531 | B2 | 1/2005 | Mientus et al. |
| 6,956,070 | B2 | 10/2005 | Fujiwara et al. |
| 7,067,575 | B2 | 6/2006 | Kitamura et al. |
| 7,563,757 | B2 | 7/2009 | Kouvroukoglou et al. |
| 7,714,086 | B2 | 5/2010 | Scheibel et al. |
| 7,754,318 | B2 | 7/2010 | Kitamura et al. |
| 7,854,994 | B2 | 12/2010 | Henderson-Rutgers et al. |
| 7,858,669 | B2 | 12/2010 | Shin et al. |
| 8,147,639 | B2 | 4/2012 | Arrington |
| 2001/0054043 | A1 | 12/2001 | Harlan |
| 2003/0108705 | A1 | 6/2003 | Duffield et al. |
| 2003/0224090 | A1 | 12/2003 | Pearce et al. |
| 2004/0180110 | A1 | 9/2004 | Mistry |
| 2005/0089548 | A1 | 4/2005 | Virgalitto et al. |
| 2005/0107498 | A1 | 5/2005 | Kolter et al. |
| 2006/0260973 | A1 | 11/2006 | Macinnes et al. |
| 2006/0275344 | A1 | 12/2006 | Mody et al. |
| 2007/0042023 | A1* | 2/2007 | Puri et al. ............ 424/443 |
| 2007/0087036 | A1 | 4/2007 | Durschlag et al. |
| 2007/0275135 | A1 | 11/2007 | Aziz et al. |
| 2008/0020220 | A1 | 1/2008 | Maurer et al. |
| 2008/0108748 | A1 | 5/2008 | Buckley et al. |
| 2008/0146481 | A1 | 6/2008 | Brown et al. |
| 2009/0110942 | A1* | 4/2009 | Henderson-Rutgers et al. ......... 428/483 |
| 2009/0134054 | A1 | 5/2009 | Lee et al. |
| 2009/0162516 | A1* | 6/2009 | Brown et al. ............ 426/576 |
| 2009/0197341 | A1 | 8/2009 | Patel et al. |
| 2010/0015315 | A1 | 1/2010 | Hoffmann et al. |
| 2010/0105821 | A1 | 4/2010 | Verrall et al. |
| 2011/0189413 | A1* | 8/2011 | Denome et al. ........ 428/35.4 |
| 2012/0027891 | A1 | 2/2012 | Tobin et al. |
| 2012/0061014 | A1 | 3/2012 | Patel et al. |

FOREIGN PATENT DOCUMENTS

| | | |
|---|---|---|
| CA | 2463250 A1 | 5/2003 |
| CA | 2474934 A1 | 8/2003 |
| CA | 2510172 A1 | 9/2004 |
| CA | 2519576 A1 | 10/2004 |
| CA | 2586052 A1 | 6/2006 |
| CA | 2589408 A1 | 7/2006 |
| CA | 2641171 A1 | 8/2006 |
| CA | 2606724 A1 | 11/2006 |
| CA | 2608531 A1 | 11/2006 |
| CA | 2669397 A1 | 5/2008 |
| CA | 2669547 A1 | 5/2008 |
| CA | 2674509 A1 | 7/2008 |
| CN | 101489404 A | 7/2009 |
| CN | 102725390 A | 10/2012 |
| EP | 0328317 A1 | 8/1989 |
| EP | 0547551 A1 | 6/1993 |
| EP | 2088187 A1 | 8/2009 |
| EP | 2258820 A1 | 12/2010 |
| EP | 2234522 B1 | 12/2011 |
| GB | 686194 A | 1/1953 |
| GB | 1042436 A | 9/1966 |
| JP | 60176560 | 9/1985 |
| JP | 63296655 | 12/1988 |
| JP | H1129683 A | 2/1999 |
| JP | 2004-500285 A | 1/2004 |
| JP | 2009-539719 A | 11/2009 |
| WO | WO-94/14330 A1 | 7/1994 |
| WO | WO-95/01735 A1 | 1/1995 |
| WO | WO-98/20752 A1 | 5/1998 |
| WO | WO-98/20862 A1 | 5/1998 |
| WO | WO-98/42214 A2 | 10/1998 |
| WO | WO-2001/036290 A1 | 5/2001 |
| WO | WO-2007/149276 A2 | 12/2007 |
| WO | WO-2009/152031 A1 | 12/2009 |
| WO | WO-2011/094687 A1 | 8/2011 |
| WO | WO-2012/025730 A2 | 3/2012 |

OTHER PUBLICATIONS

Japanese Patent Application No. 2015-552799, Office Action (English translation), dated Dec. 4, 2017.

Chinese Patent Application No. 201480014218.0, Second Office Action, dated Jun. 27, 2019.

International Application No. PCT/US2014/011023, International Search Report and Written Opinion, dated Apr. 2, 2014).

International Application No. PCT/US2014/011023, International Preliminary Report on Patentability, dated Jul. 14, 2015.

* cited by examiner

Figure 1a: The Mylar template has five 1"x1" squares which designate the five sampling areas.
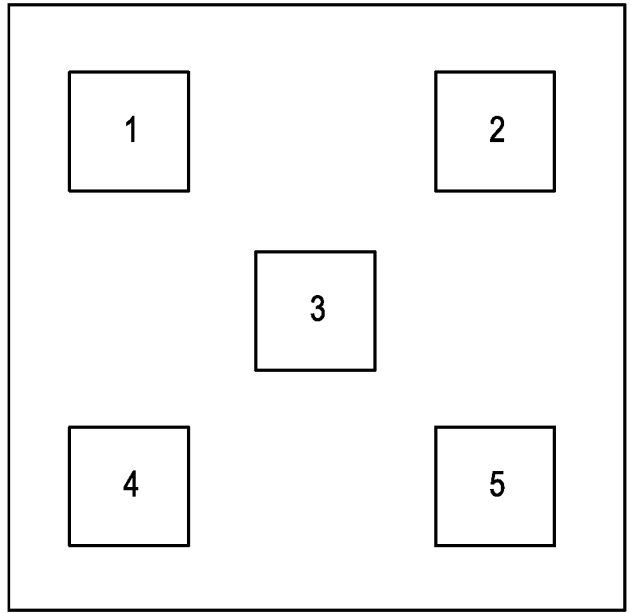
Figure 1b: Each of the templates marginal squares are ½" inch from the edges and the center square is centered 2" inches from each edge.
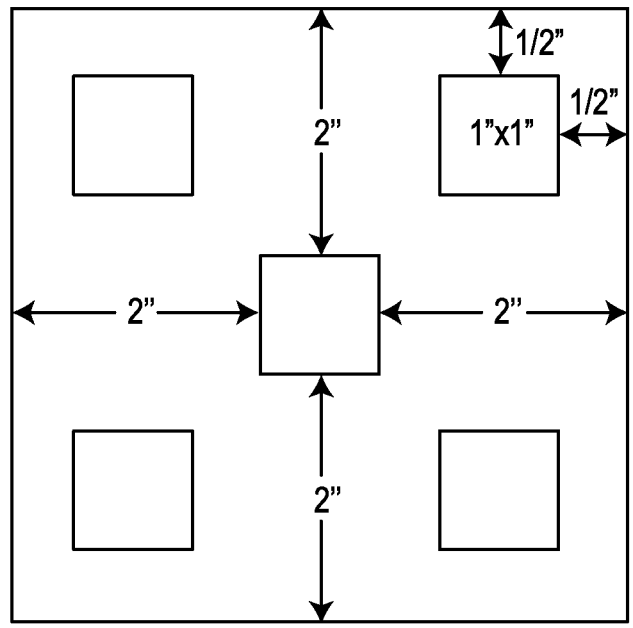

Figure 3: Plot of Dissolution Time vs Wt% of Xylitol in the Water-Soluble Film
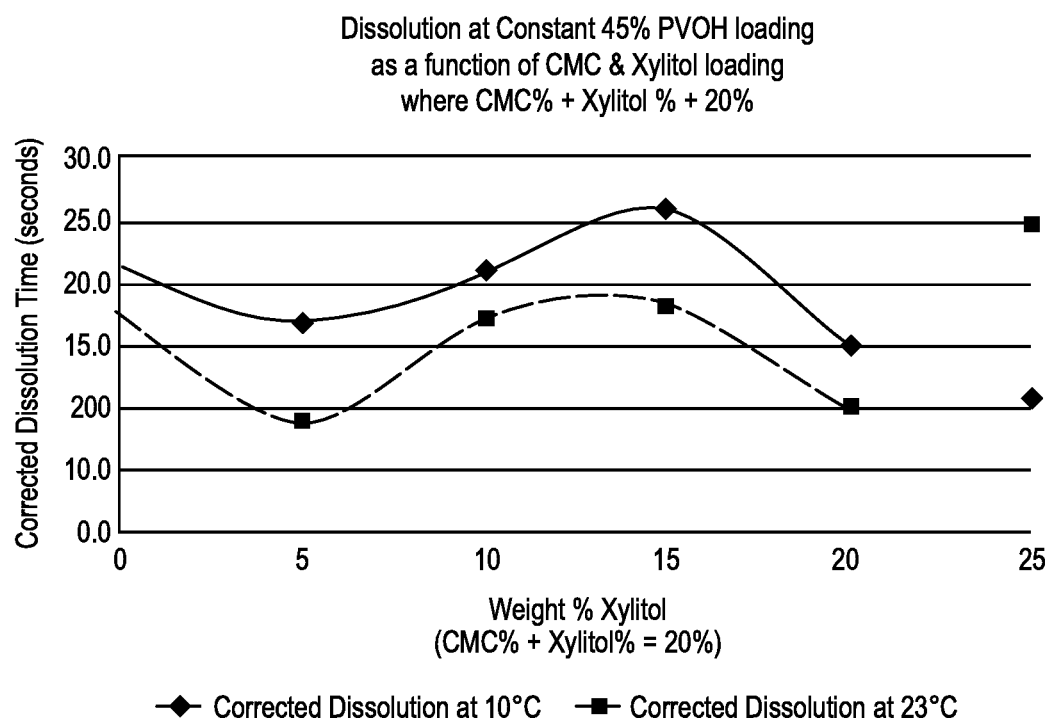

Figure 4: Mixture Contour of Tear MD. Films contain 45 wt% PVOH, and a total of 20 wt% of CMC and Xylitol combined.
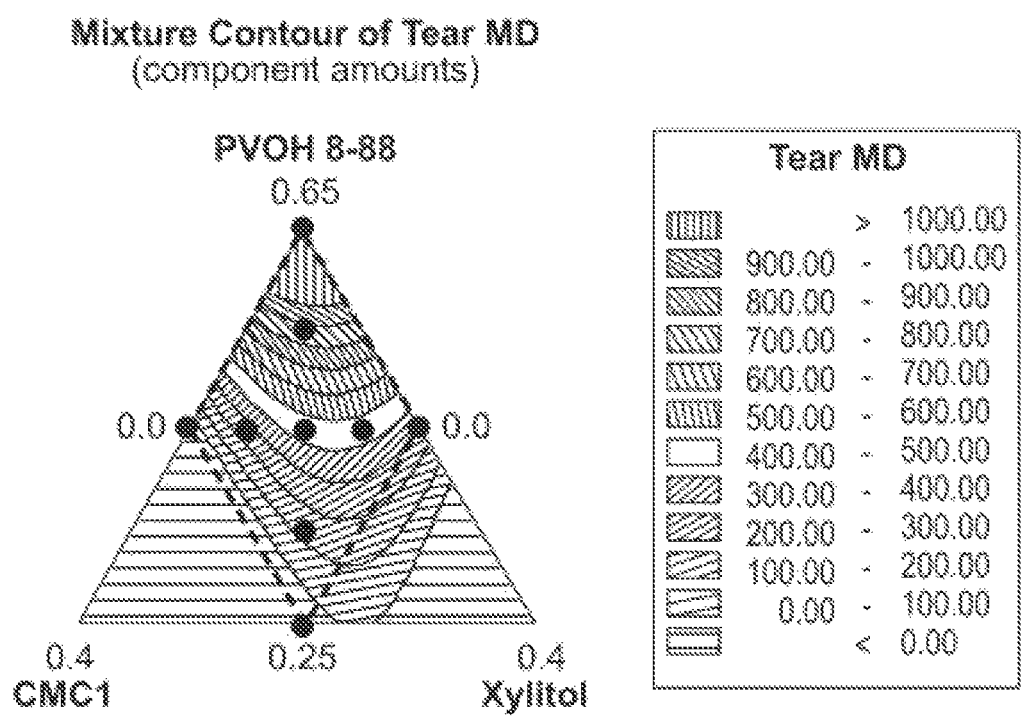

EDIBLE WATER-SOLUBLE FILM

FIELD OF THE DISCLOSURE

The present disclosure relates generally to water-soluble films. More particularly, the disclosure relates to edible water-soluble films comprising a mixture of a first water-soluble polymer, a compatibilizer polymer, and a sugar alcohol plasticizer that is a solid at room temperature.

BACKGROUND

Water-soluble films are well known in the art. Water-soluble films have many applications, including non-edible forms, such as packaging materials, and edible forms, wherein the film itself is or makes up an edible article. Edible films are known for uses such as delivery of therapeutic agents, breath freshening agents, and flavors.

When a food ingredient is provided in a traditional packaged state, the package must be torn or otherwise opened to remove the contents prior to cooking or eating. This is not only troublesome, but also has the disadvantage that the contents can tend to be spilled at the time of opening the packages, especially when they are in powder or liquid form. One solution is to package such contents with an edible film. If the packaging material is soluble in water, the package can be dissolved simply by pouring water over it or immersing it in the water, thus making it unnecessary to tear the package. Accordingly, it is highly desirable to package food contents with such a film.

Various edible water-soluble films known in the art have one or more deficiencies, including that they are not easily converted into packets or pouches, or they are particularly tough, or they are cold water soluble only. Therefore, these films cannot be used in applications that would require hot water to be added directly to the package, such as packaging for oatmeal, cocoa, or soup mixes. Additionally, it is known in the art that water-soluble films that contain a high level of sugar alcohols are often not transparent due to crystallization of or bleeding out of the sugar alcohol. In food packaging applications, it would be advantageous to package food contents in a water-soluble film that could dissolve in either hot or cold water and maintain transparency.

SUMMARY

One aspect of the disclosure is a water-soluble film including a water-soluble mixture of polyvinyl alcohol, a compatibilizing agent, and a sugar alcohol plasticizer that is a solid at room temperature, wherein the water-soluble film is substantially transparent.

Another aspect of the disclosure is a water-soluble film including a water-soluble mixture of polyvinyl alcohol, a compatibilizing agent, xylitol and a second sugar alcohol plasticizer that is a solid at room temperature, wherein the water-soluble film at about 2.0 mils thick completely dissolves in less than 50 seconds, preferably less than 40 and most preferably less than 30 at 23° C., optionally wherein the compatibilizing agent is carboxymethyl cellulose.

Still another aspect of the disclosure is a water-soluble film including a water-soluble mixture of polyvinyl alcohol, a compatibilizing agent, xylitol and a second sugar alcohol plasticizer that is a solid at room temperature, wherein the water-soluble film at about 2.0 mils thick completely dissolves in less than 50 seconds, preferably less than 40 and most preferably less than 30 at 23° C., and wherein the water-soluble film has a tear strength of at least 400 g/mil, optionally wherein the compatibilizing agent is carboxymethyl cellulose.

Still another aspect of the disclosure is a water-soluble film including a water-soluble mixture of polyvinyl alcohol, a compatibilizing agent, and a sugar alcohol plasticizer that is a solid at room temperature, wherein the sugar alcohol plasticizer that is a solid at room temperature is included in the mixture in an amount of about 20 phr or less, and is characterized by a heat of fusion of about 247 J/g or less.

Still another aspect of the disclosure is a water-soluble film including a water-soluble mixture of polyvinyl alcohol, a compatibilizing agent, and a sugar alcohol plasticizer that is a solid at room temperature, wherein the sugar alcohol plasticizer that is a solid at room temperature is included in the mixture in an amount of about 30 phr, for example about 29 phr to about 31 phr or about 25 phr to about 35 phr.

Optionally, the water-soluble films of each aspect can be thermoformed into a pouch.

Further aspects and advantages will be apparent to those of ordinary skill in the art from a review of the following detailed description. While the compositions and methods are susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWINGS

FIG. 1a is a top view of a Mylar template for determining the percent opacity of water-soluble films illustrating the designation of the five sampling areas, according to the Examples below.

FIG. 1b is a top view of the Mylar template of FIG. 1a for determining the percent opacity of water-soluble films, illustrating the placement of the five sampling areas on the Mylar template.

FIG. 3 is a plot of the dissolution time of water-soluble films vs. the weight percent of xylitol included in the water-soluble films according to Example 1.

FIG. 4 is a contour plot of the tear strengths of PVOH based water-soluble films with different loadings of CMC and xylitol according to Example 1.

DETAILED DESCRIPTION

Figure 2:
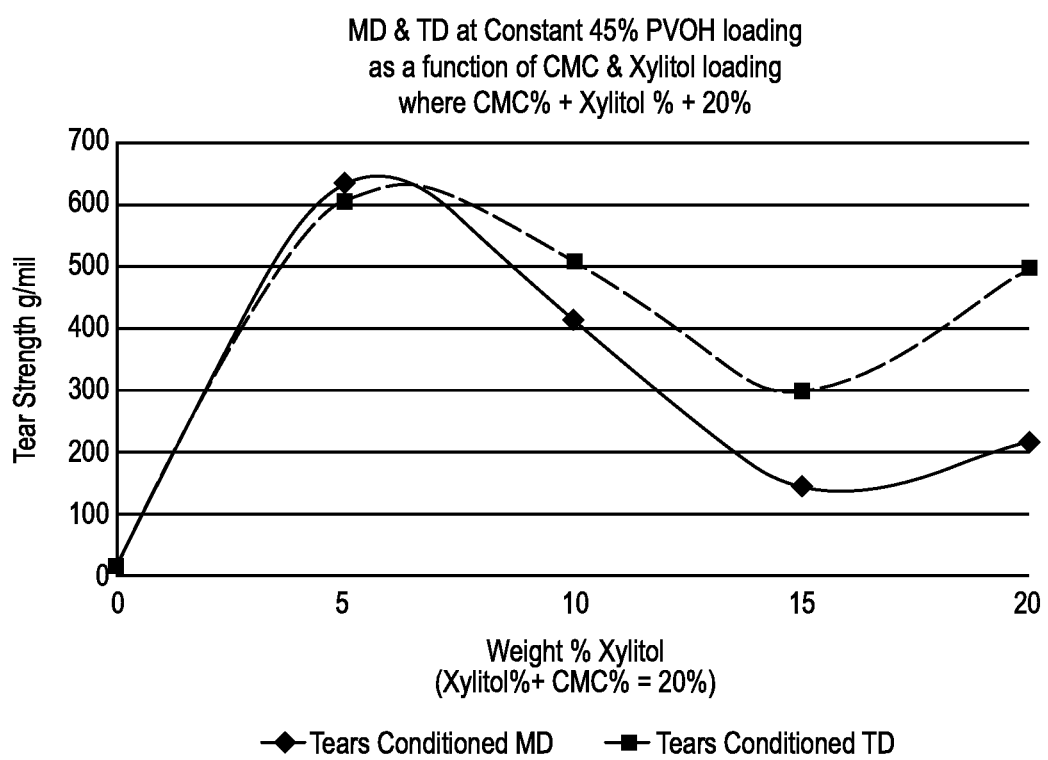
FIG. 2 is a plot of the tear strength of water-soluble films vs. the weight percent of xylitol included in the water-soluble films according to Example 1.

Disclosed herein are water-soluble films comprising a water-soluble mixture of a first water-soluble polymer, a polymer compatibilizer (for example a cellulose ether polymer or a modified starch), and a sugar alcohol plasticizer that is a solid at room temperature. Optionally, the water-soluble films are edible. The water-soluble films of one aspect of the disclosure can be particularly advantageous in that they can be designed such that the transparency of the water-soluble film is maintained for long periods of time. The water-soluble films of the disclosure herein can have one or more other, optional advantages including thermoformability (e.g., into packets) and suitable toughness for use as packaging materials. For example, optional edible embodiments can be designed according to the disclosure herein to have suitable robustness, e.g. for use as packaging. In particular, water-soluble films according to one class of embodiments of the disclosure can demonstrate unexpectedly advantageous tear strength and further optionally an unexpectedly advantageous solubility.

As used herein, the term "comprising" indicates the potential inclusion of other agents, elements, steps, or features, in addition to those specified.

As used herein and unless specified otherwise all measurements of PVOH viscosity in centipoise (cP) are of a 4% solution at 20° C., and all measurements of carboxymethyl cellulose viscosity are of a 2% solution at 25° C.

As used herein, "substantial transparency" refers to a water-soluble film that, when cast to a thickness of about 2.0 mm, has a measured opacity of about 37.0% or less, as determined by an X-RITE SP60 Series Sphere Spectrophotometer X-64 colorimeter as described herein, or substantial equivalent, after storing for at least 30 days.

As used herein, "Δ% opacity" refers to the change in opacity, as determined by an X-RITE SP60 Series Sphere Spectrophotometer X-64 colorimeter as described herein, or substantial equivalent, between the opacity of a film at t=0 after film forming, and the opacity of the same film after conditioning and storage.

As used herein, "enhanced transparency" refers to a water-soluble film according to the disclosure herein that, when cast to a thickness of about 2.0 mils, demonstrates an opacity of 37.0% or less, as determined by an X-RITE SP60 Series Sphere Spectrophotometer X-64 colorimeter as described herein, or substantially equivalent, optionally after storing for at least 30 days.

As used herein, "favorable solubility" refers to a film according to the disclosure herein that, at about 2.0 mils thick, completely dissolves in less than 50 seconds, preferably less than 40 and most preferably less than 30 seconds in water at 23° C.

As used herein, "good tear strength" refers to a tear strength of at least 400 g/mil at 23° C. as measured by an Elmdorf Tearing Tester model number 40043, or equivalent.

As used herein and unless specified otherwise, the terms "wt. %" and "wt %" are intended to refer to the composition of the identified element in "dry" (non water) parts by weight of the entire film (when applicable) or parts by weight of the entire composition enclosed within a pouch (when applicable). As used herein and unless specified otherwise, the term "phr" is intended to refer to the composition of the identified element in parts per one hundred parts water-soluble PVOH resins.

Water-soluble films, optional ingredients for use therein, and methods of making the same are well known in the art. In one class of embodiments, the water-soluble film includes polyvinyl alcohol (PVOH). PVOH is a synthetic resin generally prepared by the alcoholysis, usually termed hydrolysis or saponification, of polyvinyl acetate. Fully hydrolyzed PVOH, wherein virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—less than about 50 ° F. (10° C.). An intermediate cold/hot water soluble film can include, for example, intermediate partially-hydrolyzed PVOH (e.g., with degrees of hydrolysis of about 94% to about 98%), and is readily soluble only in warm water—e.g., rapid dissolution at temperatures of about 40° C. and greater. Both fully and partially hydrolyzed PVOH types are commonly referred to as PVOH homopolymers although the partially hydrolyzed type is technically a vinyl alcohol-vinyl acetate copolymer.

The degree of hydrolysis (DH) of the PVOH included in the water-soluble films of the present disclosure can be about 75% to about 99%. As the degree of hydrolysis is reduced, a film made from the resin will have reduced mechanical strength but faster solubility at temperatures below about 20° C. As the degree of hydrolysis increases, a film made from the resin will tend to be mechanically stronger and the thermoformability will tend to decrease. The degree of hydrolysis of the PVOH can be chosen such that the water-solubility of the resin is temperature dependent, and thus the solubility of a film made from the resin, compatibilizer polymer, and additional ingredients is also influenced. In one class of embodiments the film is cold water-soluble. A cold water-soluble film, soluble in water at a temperature of less than 10 ° C., can include PVOH with a degree of hydrolysis in a range of about 75% to about 90%, or in a range of about 80% to about 90%, or in a range of about 85% to about 90%. In another class of embodiments the film is hot water-soluble. For example, a hot water-soluble film is advantageous for edible applications such as water-soluble packets enclosing a hot food item, e.g. oatmeal, cocoa, or soup mix. A hot water-soluble film, soluble in water at a temperature of at least about 60° C., can include PVOH with a degree of hydrolysis of at least about 98%.

Other film-forming, water soluble resins for use in addition to or in an alternative to PVOH can include, but are not limited to modified polyvinyl alcohols, polyacrylates, water-soluble acrylate copolymers, polyvinyl pyrrolidone, pullulan, water-soluble natural polymers including, but not limited to, guar gum, xanthan gum, carrageenan, and starch, water-soluble polymer derivatives including, but not limited to, ethoxylated starch and hydroxypropylated starch, copolymers of the forgoing and combinations of any of the foregoing.

The water-soluble polymers can be included in the film composition in an amount in a range of about 30 wt. % to about 90 wt. %, for example. The weight ratio of the amount of the water-soluble polymer as compared to the combined amount of all plasticizers, compatibilizing agents, and secondary additives can be in a range of about 0.5 to about 9, about 0.5 to about 5, or about 1 to 3, or about 1 to 2, for example.

Water-soluble polymers for use in the films described herein (including, but not limited to PVOH polymers) can be characterized by a viscosity in a range of about 3.0 to about 27.0 cP, or about 3.0 cP to about 15 cP, or about 6.0 to about 10.0 cP. The viscosity of a PVOH polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20 ° C. All viscosities specified herein in cP should be understood to refer to the viscosity of 4% aqueous polyvinyl alcohol solution at 20° C., unless specified otherwise.

It is well known in the art that the viscosity of a PVOH polymer is correlated with the weight average molecular weight ($\overline{M}w$) of the same PVOH polymer, and often the viscosity is used as a proxy for $\overline{M}w$. Thus, the weight average molecular weight of the water-soluble polymer can be in a range of about 30,000 to about 175,000, or about 30,000 to about 100,000, or about 55,000 to about 80,000.

In one class of embodiments, the molecular weight of the water-soluble polymer is in the range of about 55,000 to about 80,000. Unexpectedly, a water-soluble film according to the disclosure comprising polymers with molecular weights in the range of about 55,000 to about 80,000, demonstrate enhanced transparency properties. If the molecular weight of the water-soluble polymer is too high, the resulting water-soluble film does not maintain substantial transparency.

In one type of embodiment, a water-soluble film including a mixture of PVOH (e.g., about 87.7% hydrolyzed) having a 4% solution viscosity of about 8 cps and 10 phr of sorbitol can demonstrate substantial transparency for 30 days. In contrast, a water-soluble film including a mixture of PVOH (about 87.7% hydrolyzed) having a viscosity of 23 cps and 10 phr of sorbitol demonstrates substantial transparency for only 4 days.

Water-soluble films of the present disclosure can include a compatibilizing agent for the sugar alcohol plasticizer that is a solid at room temperature. As used herein, a "compatibilizing agent" is a component that when included in the water-soluble film in a range of about 15 phr to about 20 phr (a ratio of about 2:1 to about 1:2 to the sugar alcohol plasticizer that is a solid at room temperature), results in the water-soluble film maintaining transparency at a sugar alcohol loading that would otherwise cause the water-soluble film to lose transparency. For example, a water-soluble film including a compatibilizing agent is able to maintain a Δ% opacity of 2.0% or less for a longer time period than an otherwise identical film that does not include the compatibilizing agent. The compatibilizing agent can be included in the water-soluble films of the present disclosure in a range of about 10 phr to about 25 phr, or in a range of about 13 phr to about 22 phr, or in a range of about 15 phr to about 20 phr. As the amount of compatibilizing agent included in the water-soluble film is reduced, the water-soluble film tends to lose transparency. As the amount of compatibilizing agent included in the water-soluble film is increased, the water-soluble film becomes more brittle and has slower dissolution times.

Suitable compatibilizers include, but are not limited to, cellulose ethers such as methylcellulose, hydroxypropyl methylcellulose, carboxymethyl cellulose, salts thereof, polysaccharides of pectin, polysaccharides of sodium alginate, modified starches such as acid-modified, hydroxypropylated starches (e.g., Pure-Cote B760 or B790 available from Grain Processing Corporation, Muscatine, Iowa), hydroxyethyl starches (e.g., Ethylex 2035 available from Tate & Lyle Ingredients Americas LLC, 2200 E. Eldorado Street, Decater, Ill.) , and combinations of any of the foregoing. In one class of embodiments, the compatibilizer comprises sodium carboxymethyl cellulose (CMC). The degree of substitution of the CMC can be from about 0.60 to about 0.95, for example. As used herein, "degree of substitution" refers to the number of hydroxyl groups that have been substituted with a sodium carboxymethyl group ($CH_2COO(Na)$) per monomer unit. In one type of embodiment, the viscosity of a 2% aqueous solution of CMC is in a range of about 20 to about 80 cP, as measured at 25° C. on a Brookfield LVT viscometer. In another class of embodiments, the compatibilizer comprises a hydroxypropylated starch. In one type of embodiment, the hydroxypropylated starch can have a 9.1% moisture content, a pH of about 6.3, an ash content of 0.20 wt. % and a protein content of 0.173 wt. %. In another class of embodiments, the compatibilizing agent comprises a hydroxyethyl starch. The level of ethoxylation can be from about 2 wt. % to about 3 wt. %, for example, as the total weight of the substituent units divided by the total weight of the polymer.

Water-soluble films according to the present disclosure further include sugar alcohol plasticizers that are solids at room temperature. Sugar alcohol plasticizers that are solid at room temperature include, but are not limited to, isomalt, maltitol, sorbitol, xylitol, erythritol, adonitol, dulcitol, pentaerythritol, mannitol and combinations thereof. Suitable sugar alcohols are available from Rochem Intl. (Ronkonkoma, N.Y.), Roquette (Lestrem, France), and Sigma-Aldrich Co, LLC (St. Louis, Mo.).

Sugar alcohol plasticizers that are solid at room temperature can be included in the water-soluble films of the present disclosure in an amount in a range of about 5 phr to about 35 phr, or about 5 phr to about 25 phr, or about 10 phr to about 25 phr, or about 10 phr to about 25 phr, for example 10 phr, 15 phr, 20 phr, 25 phr, or 30 phr. A sugar alcohol plasticizer that is a solid at room temperature can be present in the water-soluble films of the present disclosure in an amount such that the ratio of compatibilizing agent to sugar alcohol plasticizer that is a solid at room temperature is in a range of about 2:1 to 1:2, for example about 2:1, about 1.9:1, about 1.8:1, about 1.7:1, about 1.6:1, about 1.5:1, about 1.4:1, about 1.3:1, about 1.2:1, about 1.1:1, about 1:1, about 0.9:1, about 0.8:1, about 0.7:1, about 0.6:1 and/or about 0.5:1. As the amount of sugar alcohol included in the water-soluble film increases, the transparency of the water-soluble film becomes more negatively affected. As the amount of sugar alcohol included in the water-soluble film is reduced, the solubility of the water-soluble film becomes negatively affected. That is, for example, at a constant temperature a film of equal thickness will take longer to dissolve.

In one class of embodiments, the sugar alcohol plasticizer that is a solid at room temperature comprises two or more sugar alcohol plasticizers that are solids at room temperature. The two or more sugar alcohol plasticizers can be included in the film composition in any relative amounts. For example, the two or more sugar alcohol plasticizers can be included in the film composition in equal amounts, or one of the sugar alcohol plasticizers that is a solid at room temperature can be a minor impurity in another sugar alcohol plasticizer as provided by a commercial supplier. In another type of embodiment, the sugar alcohol plasticizer that is a solid at room temperature will include one that has a relatively high heat of fusion (e.g. above 247 J/g, or above192 J/g) and a second one that has a relatively low heat of fusion (e.g. 247 J/g or less, or 192 J/g or less, respectively).

In one class of embodiments, the sugar alcohol plasticizer that is a solid at room temperature is selected from the group consisting of isomalt, maltitol, sorbitol, xylitol, adonitol, mannitol, and combinations thereof, and further optionally the ratio of compatibilizing agent to sugar alcohol present in the water-soluble film is about 2:1. As described below, water-soluble film according to this class of embodiments (including the described ratio of compatibilizing agent to sugar alcohol), cast to about 2.0 mils thick, maintained a Δ% opacity of 2.0% or less for at least 4 days longer than water-soluble films of a similar composition except with no compatibilizing agent included, or at least 21 days longer, or at least 25 days longer.

In another class of embodiments, the sugar alcohol plasticizer that is a solid at room temperature is selected from the group consisting of isomalt, maltitol, sorbitol, xylitol, adonitol, and combinations thereof, and further optionally the ratio of compatibilizing agent to sugar alcohol present in the water-soluble film is less than 2:1. Water-soluble films according to this class of embodiments (including the described ratio of compatibilizing agent to sugar alcohol), cast to about 2.0 mils thick, were shown to maintain a Δ% opacity of 2.0% or less for at least 12 days longer than water-soluble films of a similar composition except with no CMC included, or at least 19 days longer, or at least 23 days longer, or at least 28 days longer.

Unexpectedly, there was found to be no correlation between the number of carbons, molecular weight, or structure (linear vs cyclic or structural isomers) of the sugar alcohol and the compatibilization of the sugar alcohol by the compatibilizing agent. That is, the transparency enhancement of the water-soluble films that include the compatibilizing agent could not be predicted based on the number of carbons, molecular weight, or structure (linear vs. cyclic or structural isomers) of the sugar alcohol. As mentioned above, "enhanced transparency" as used herein refers to a water-soluble film that demonstrates an opacity of 37.0% or less as measured by a spectrophotometer, for example, 36.8% or less, or 36.6% or less. Unacceptable amounts of cloudiness of the water-soluble film results when a water-soluble film has an opacity of 37.2% or more, 37.3% or more, or 37.4% or more. More unexpectedly, the ability of a given compatibilizing agent/sugar alcohol combination to result in a water-soluble film with enhanced transparency (relative to a film with the same sugar alcohol and no compatibilizing agent) can be predicted based on the heat of fusion of the sugar alcohol. In one class of embodiments enhanced transparency is demonstrated when a sugar alcohol plasticizer that is a solid at room temperature characterized by a heat of fusion of about 247 J/g or less is included in a water-soluble film in an amount of about 20 phr or less, with a compatibilizing agent. Suitable sugar alcohol plasticizers that demonstrate enhanced transparency when included in a water-soluble film with a compatibilizing agent in an amount of about 20 phr or less can include, consist essentially of, or can consist of one or more of isomalt, maltitol, sorbitol, adonitol, and xylitol, and combinations thereof. For example, it was shown that a water-soluble film comprising 10 phr of xylitol, having a heat of fusion of 247 J/g, demonstrated an opacity of 36.6 after 30 days. In contrast, a water-soluble film comprising 10 phr of pentaerythritol, having a heat of fusion of 289 J/g, demonstrated an opacity of 38.6 after 30 days and had an undesirable cloudiness. In another, non-exclusive class of embodiments enhanced transparency is demonstrated when a sugar alcohol plasticizer that is a solid at room temperature characterized by a heat of fusion of about 247 J/g or less and has at least two adjacent, non sterically hindered hydroxyl groups in a common plane is included in a water soluble film in an amount of about 20 phr or less. Without intending to be bound by theory, it is believed that the at least two sterically unhindered adjacent hydroxyl groups in a common plane favors the hydrogen bonding of the hydroxyls of the sugar alcohol with the hydroxyls of PVOH. Further, without intending to be bound by theory, it is believed that the hydrogen bonding interactions of the sugar alcohol with the PVOH stabilizes the sugar alcohols in the film formulation, allowing for a greater loading of the sugar alcohols characterized by a heat of fusion of 247 J/g or less. In another class of embodiments, enhanced transparency is demonstrated when a sugar alcohol plasticizer that is a solid at room temperature characterized by a heat of fusion of about 192 J/g or less is included in a water-soluble film in an amount of about 25 phr to about 35 phr, or about 30 phr, with a compatibilizing agent. Suitable sugar alcohol plasticizers that demonstrate enhanced transparency when included in a water-soluble film with a compatibilizing agent in an amount of about 25 phr to about 35 phr, or about 30 phr include, but are not limited to, isomalt, sorbitol, and combinations thereof. For example, it was shown that a water-soluble film comprising 30 phr of sorbitol, having a heat of fusion of 192 J/g demonstrated an opacity of 35.7 after 30 days. In contrast, a water-soluble film comprising 30 phr of adonitol, having a heat of fusion of 232 J/g, had an opacity of 42.4 after 30 days and had an undesirable cloudy appearance. In another, non-exclusive class of embodiments enhanced transparency is demonstrated when a sugar alcohol plasticizer that is a solid at room temperature characterized by a heat of fusion of about 192 J/g or less and has at least two adjacent, non sterically hindered hydroxyl groups in a common plane is included in a water soluble film in an amount of about 25 phr to about 35 phr, for example 30 phr. Without intending to be bound by theory, it is believed that the at least two sterically unhindered adjacent hydroxyl groups in a common plane favors the hydrogen bonding of the hydroxyls of the sugar alcohol with the hydroxyls of PVOH. Further, without intending to be bound by theory, it is believed that the hydrogen bonding interactions of the sugar alcohol with the PVOH stabilizes the sugar alcohols in the film formulation, allowing for a greater loading of the sugar alcohols characterized by a heat of fusion of 192 J/g or less.

In one class of embodiments, the water-soluble film includes a mixture of PVOH, CMC, xylitol, and sorbitol. The CMC to xylitol ratio can be 3:1, for example, while the ratio of compatibilizing agent to total sugar alcohol plasticizer that is a solid at room temperature is in the range of about 2:1 to 1:2. Unexpectedly, a water-soluble film comprising a 3:1 CMC to xylitol ratio demonstrated both favorable solubility and good tear strength. As described above, when used herein, "favorable solubility" refers to a film that, at about 2.0 mils thick, completely dissolves in less than 50 seconds, preferably less than 40 and most preferably less than 30 seconds in water at 23° C. As used herein, "good tear strength" refers to a tear strength of at least 400 g/mil as measured by an Elmdorf Tearing Tester model number 40043, or equivalent as described in the Tear Strength Measurements section below. Surprisingly, a water-soluble film including a 3:1 ratio of CMC to xylitol had a faster rate of dissolution than a water-soluble film including a CMC to xylitol ratio in which the xylitol is the major component. The rate of dissolution of the water-soluble film including a 3:1 ratio of CMC to xylitol was also comparable to the rate at which a water soluble film of the same composition, except with no CMC, dissolves. The rate of dissolution of a water-soluble film comprising CMC and xylitol would be expected to decrease when the amount of CMC in the water-soluble film increased because CMC has a slower rate of dissolution than xylitol.

More unexpectedly, a water-soluble film comprising a 3:1 ratio of CMC to xylitol demonstrates an increase in tear strength relative to a water-soluble film comprising either CMC or xylitol alone. Both CMC and xylitol are known to independently reduce the tear strength of water-soluble films comprised of PVOH. The inclusion of both components in a water-soluble film would be expected to compound the individual effects, reducing the tear strength of a PVOH based water soluble film comprising to a level between the PVOH tear strength of a water-soluble film with CMC only and the PVOH tear strength of a water-soluble film with only xylitol.

The water-soluble films according to the present disclosure may include other optional additive ingredients including, but not limited to, plasticizers that are liquids at room temperature, surfactants, film formers, antiblocking agents, internal release agents and other functional ingredients, for example in amounts suitable for their intended purpose.

Water is recognized as a very efficient plasticizer for PVOH and other polymers; however, the volatility of water makes its utility limited since polymer films need to have at least some resistance (robustness) to a variety of ambient conditions including low and high relative humidity. Glycerin is much less volatile than water and has been well established as an effective plasticizer for PVOH and other polymers. Glycerin or other such liquid plasticizers by themselves can cause surface "sweating" and greasiness if the level used in the film formulation is too high. This can lead to problems in a film such as unacceptable feel to the hand of the consumer and even blocking of the film on the roll or in stacks of sheets if the sweating is not mitigated in some manner, such as powdering of the surface. This could be characterized as over plasticization. However, if too little plasticizer is added to the film the film may lack sufficient ductility and flexibility for many end uses, for example to be converted into a final use format such as pouches.

Plasticizers that are liquids at room temperature for use in water-soluble films of the present disclosure include, but are not limited to, glycerol, diglycerol, propylene glycol, ethylene glycol, diethyleneglycol, triethylene glycol, tetraethyleneglycol, polyethylene glycols up to MW 400, 2 methyl 1, 3 propane diol, lactic acid and combinations thereof. As less plasticizer is used, the film becomes more brittle, whereas as more plasticizer is used the film loses tensile strength. Plasticizers that are liquids at room temperature can be included in the water-soluble films in an amount in a range of about 25 phr to about 50 phr, or from about 30 phr to about 45 phr, or from about 35 phr to about 40 phr, for example.

Surfactants for use in water-soluble films are well known in the art. Optionally, surfactants are included to aid in the dispersion of the polymer solution upon casting. Suitable surfactants for water-soluble films of the present disclosure include, but are not limited to, dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. Thus, surfactants can be included in the water-soluble films in an amount of less than about 2 phr, for example less than about 1 phr, or less than about 0.5 phr, for example.

A class of embodiments of the water-soluble films according to the present disclosure is characterized by the water-soluble film being edible. In this class of embodiments the water-soluble polymers can include, can consist essentially of, or can consist of one or more of PVOH, modified PVOH, water-soluble natural polymers including, but not limited to, guar gum, xanthan gum, carrageenan, and starch, water-soluble polymer derivatives including, but not limited to, ethoxylated starch and hydroxypropylated starch, copolymers of the forgoing, and combinations of the forgoing. In one class of edible embodiments, the water-soluble polymer is included in the film composition in the lowest amount possible that will still allow the resulting film to demonstrate acceptable tear strength, solubility, tensile strength, elongation at break, and energy to break. Optional ingredients for inclusion in water-soluble films according to the disclosure include one or more of plasticizers that are liquid at room temperature, surfactants, compatibilizers, co-polymers, and co-film formers, for example. Liquid plasticizers can include, consist essentially of, or consist of one or more of glycerol, diglycerol, propylene glycol, low molecular weight polyethylene glycol (e.g., having a liquid consistency, for example having a molecular weight such as 200, 300, and 600), monoacetin, triacetin, triethyl citrate, and 1,3-butanediol. Surfactants can include, consist essentially of, or consist of dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, for example. Film formers can include, consist essentially of, or consist of one or more of pullulan, pectin, starch, gelatin, sodium alginates and modified starches. Other optional ingredients will be apparent to one of ordinary skill in the art in view of the present disclosure. Components for inclusion in edible water soluble films can be those designated as "Generally Recognized as Safe" (GRAS) by the United States Food and Drug Administration, and/or components with assigned, allowable E-numbers in the European Union, and/or components that are not yet designated as GRAS or E-numbered but have gone through proper testing and have been demonstrated as safe for human consumption in the amounts proposed for use in the film.

Water-soluble films according to the present disclosure can be designed by the disclosure herein to demonstrate excellent practical toughness. As used herein, "excellent practical toughness" refers to one or more of tensile strength, elongation at break, and energy to break values that fall within the ranges described herein, optionally a combination of all three of tensile strength, elongation at break, and energy to break values. Thus, according to this aspect of the invention the water-soluble films according to the present disclosure can have a tensile strength of at least about 10 N/mm$^2$, or greater than about 12 N/mm$^2$, or greater than about 14 N/mm$^2$, or greater than about 16 N/mm$^2$ as measured on a Model 5543 Instron® Tensile Tester, or equivalent, as described in the Tensile Strength Measurement section below. The water-soluble films according to this aspect of the invention can have an elongation at break value of at least about 250%, or greater than about 300%, or greater than about 350%, or greater than about 400% as measured on a Model 5543 Instron® Tensile Tester, or equivalent, as described in the Tensile Strength Measurement section below. The water-soluble films according to this aspect of the invention can have an energy to break of at least about 0.5 J/mm$^2$, or greater than about 1.0 J/mm$^2$, or greater than about 1.23 J/mm$^2$ as measured on a Model 5543 Instron® Tensile Tester, or equivalent, as described in the Tensile Strength Measurement section below. In one class of embodiments, a water-soluble film according to the disclosure includes PVOH, a CMC compatibilizing agent and a combination of xylitol and sorbitol as the sugar alcohol plasticizer that is a solid at room temperature, with a CMC to sugar alcohol plasticizer ratio of about 1.1:1. Water-soluble films according to this embodiment demonstrate good dissolution time at 23° C., for example about 22.8 seconds, good tensile strength, for example about 21.3 N/mm$^2$, good elongation to break, for example about 467.3%, and good energy to break, for example about 1.7 J/mm$^2$. In another class of embodiments, a water-soluble film according to the disclosure includes PVOH, a modified starch compatibilizing agent and a combination of xylitol and sorbitol as the sugar alcohol plasticizer that is a solid at room temperature, with a compatibilizing agent to sugar alcohol plasticizer ratio of about 1.1:1. Water-soluble films according to this embodiment demonstrate good dissolution time at 23° C., for example about 31.4 seconds, good tensile strength, for example about 19.6 N/mm$^2$, good elongation to break, for example about 497.7%, and good energy to break, for example about 1.5 J/mm$^2$.

The water-soluble films can be formed into a water-soluble packet. Packets may be made using any suitable equipment and method, including the various methods already commonly known in the art. The water-soluble film optionally can be drawn into a suitable mold. Heat can be applied to the water-soluble film during the process, to result in a process commonly known as thermoforming. Water-soluble films according to the present disclosure are heat sealable. As used herein, "heat sealable" refers to films that when heat sealed at a temperature in a range of about 275° F. to about 300° F. (135° C. to about 150° C.) do not peel apart by hand without tearing the film and do not show any indications of degradation (i.e., browning or bubbling) when heat sealed in a TS-12 Heat Sealer available from Lako Tool & Manufacturing, Inc of Perrysburg, Ohio, or equivalent, as described in the Heat Seal Measurements section below. In one class of embodiments, the heat sealable water-soluble films have a peak load ratio (i.e. a ratio of the seal peak load to the film peak load) of at least about 0.30, at least about 0.32, at least about 0.35, or at least about 0.36 as determined by measurements taken on a Model 5543 Instron® Tensile Tester, or equivalent, as described in the Tensile Strength Measurement section below. Water-soluble films according to the present disclosure are thermoformable. As used herein, "thermoformable" refers to a water soluble film that has an elongation at about 23° C. and 35% relative humidity of at least about 250%, or at least about 300% and is heat stable.

Specific contemplated aspects of the disclosure are herein described in the following numbered paragraphs.

1. A water soluble film, comprising a water soluble mixture of
   a water soluble resin,
   a compatibilizing agent, and
   a sugar alcohol plasticizer that is a solid at room temperature,
   wherein the water soluble film is substantially transparent.

2. The water soluble film of paragraph 1, wherein the sugar alcohol plasticizer is included in an amount of about 20 phr or less and is characterized by a heat of fusion of about 247 J/g or less.

3. The water soluble film of paragraph 1, wherein the sugar alcohol plasticizer is included in an amount of about 25 to about 35 phr and is characterized by a heat of fusion of about 192 J/g or less.

4. A water soluble film, comprising a water soluble mixture of
   a water soluble resin,
   a compatibilizing agent,
   xylitol, and
   a second sugar alcohol plasticizer that is a solid at room temperature,
   wherein the water soluble film of about 2.0 mils thick dissolves in less than 50 seconds, preferably less than 40 and most preferably less than 30 at 23° C., and
   wherein the compatibilizing agent is carboxymethyl cellulose.

5. The water soluble film according to any of the preceding paragraphs, wherein the sugar alcohol plasticizer is a combination of at least two or more sugar alcohol plasticizers that are solid at room temperature.

6. The water soluble film according to any one of the preceding paragraphs, wherein the water soluble film has a tear strength of at least 400 g/mL.

7. The water soluble film according to any one of the preceding paragraphs, wherein the water soluble film is substantially transparent.

8. The water soluble film according to any one of paragraphs 4-7, wherein the ratio of compatibilizing agent to xylitol is about 3:1.

9. The water soluble film according to any one of the preceding paragraphs, wherein the water soluble film is edible.

10. The water soluble film according to any one of the preceding paragraphs, wherein the water soluble resin is selected from the group consisting of polyvinyl alcohol, modified polyvinyl alcohols, water-soluble natural polymers including, guar gum, xanthan gum, carrageenan, and starch, water-soluble polymer derivatives including, ethoxylated starch and hydroxypropylated starch, copolymers of the forgoing, or any combination of the forgoing.

11. The water soluble film according to paragraph 10, wherein the water soluble resin comprises polyvinyl alcohol.

12. The water soluble film according to paragraph 10, wherein the water soluble resin comprises polyvinyl alcohol with a degree of hydrolysis in a range of about 75% to about 99%.

13. The water soluble film according to paragraph 10, wherein the polyvinyl alcohol is further characterized by a weight average molecular weight in a range of about 55,000 to about 80,000.

14. The water soluble film according to any one of the preceding paragraphs, wherein the water soluble resin is included in the film in an amount in a range of about 35 to about 90 wt. %, based on the total weight of the film.

15. The water soluble film according to any one of the preceding paragraphs, wherein the sugar alcohol plasticizer that is a solid at room temperature is included in the film an amount in a range of about 5 to about 35 parts per hundred parts resin (phr).

16. The water soluble film according to any one of paragraphs 4-16, wherein the sugar alcohol plasticizer that is a solid at room temperature, or mixtures thereof, is characterized by a heat of fusion of less than about 274 J/g.

17. The water soluble film according to any one of paragraphs 4-17, wherein the sugar alcohol plasticizer that is a solid at room temperature, or mixtures thereof, is characterized by a heat of fusion in a range of less than about 192 J/g.

18. The water soluble film according to any one of the preceding paragraphs, wherein the sugar alcohol plasticizer that is a solid at room temperature is selected from the group consisting of isomalt, maltitol, sorbitol, adonitol, xylitol, and combinations of any of the forgoing.

19. The water soluble film according to any one of the preceding paragraphs, wherein the sugar alcohol plasticizer that is a solid at room temperature comprises a mixture of xylitol with at least one member of the group consisting of maltitol, sorbitol, and isomalt.

20. The water soluble film according to any one of the preceding paragraphs, wherein the compatibilizing agent is selected from the group consisting of a cellulose ether, modified starch, polysaccharides of pectin, polysaccharides of sodium alginate, or combinations thereof.

21. The water soluble film according to paragraph 20, wherein the cellulose ether comprises carboxymethyl cellulose.

22. The water soluble film according to paragraph 21, wherein the carboxymethyl cellulose has a degree of substitution in a range of about 0.6 to about 0.95.

23. The water soluble film according to any one of the preceding paragraphs, wherein the compatibilizing agent is included in the film in an amount in a range of about 10 to about 25 phr.

24. The water soluble film according to any one of the preceding paragraphs, wherein the ratio of compatibilizing agent to sugar alcohol plasticizer that is a solid at room temperature is about 2:1 to about 1:2.

25. The water soluble film according to any one of the preceding paragraphs, further comprising a liquid plasticizer selected from the group consisting of glycerol, diglycerol, propylene glycol, ethylene glycol, diethyleneglycol, triethylene glycol, tetraethyleneglycol, polyethylene glycols up to MW 400, 2 methyl 1,3 propane diol and combinations of the forgoing.

26. The water soluble film according to paragraph 25, wherein the liquid plasticizer is present in the film an amount in a range of about 25 to about 50 phr.

27. The water soluble film according to any one of the preceding paragraphs, further comprising a surfactant.

28. The water soluble film according to paragraph 27, wherein the surfactant is selected from the group consisting of dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations of any of the forgoing.

29. The water soluble film according to paragraph 27, wherein the surfactant is present in the film an amount in of less than about 2 phr.

30. The water soluble film according to any one of the preceding paragraphs, wherein the water soluble film is characterized by a tear resistance of at least 500 g/mil.

31. The water soluble film according to any one of the preceding paragraphs, wherein the film is heat sealable.

32. The water soluble film of paragraph 31, wherein the film is thermoformable.

33. The water soluble film of paragraph 31, wherein the film has a peak load ratio of at least about 0.30.

34. The water soluble film according to any one of the preceding paragraphs, wherein the film has a tensile strength of at least 10 N/mm$^2$.

35. The water soluble according to any one of the preceding paragraphs, wherein the film has an elongation at break of at least 250%.

36. The water soluble film according to any one of the preceding paragraphs, wherein the film has an energy break of at least 0.5 J/mm$^2$.

37. The water soluble film according to any one of the preceding paragraphs, wherein the film maintains a Δ% opacity of 2.0% or less for at least 4 days longer than an otherwise identical film having no compatibilizing agent.

38. A water soluble packet, comprising a film according to any one of the preceding paragraphs.

EXAMPLES

Transparency Measurements

Various sugar alcohols were added to polyvinyl alcohol formulations and cast at nominally 2.0 mil thicknesses to determine if the film turns cloudy. These experiments were performed with and without carboxymethyl cellulose (CMC). All film samples were hung in a lab environment set to operate at 23° C.+/−3 ° C. (73° F.+/−5 ° F.) with an observed range of 20° C.-26° C. (66° F.-78° F.). The relative humidity of the lab was set to 50% +/−5% with an observed range of 30%-60% RH (RH=relative humidity). Each film was observed every four days plus or minus a day for a two week minimum.

The films were tested for a change in the percent opacity by an X-RITE SP60 Series Sphere Spectrophotometer X-64 colorimeter, available from X-Rite Incorporated, Grand Rapids, Michigan. The spectrophotometer was calibrated using X-Rite Calibration Standard SP62-162 (L*05.17, a*−1.16, B* −0.20). A 5" by 5" square of Mylar (approximately 4.75 mil gauge) was cut and the average opacity was determined to be 18.61 by the spectrophotometer. Five 1" by 1" squares were drawn on the Mylar squares with a fine tip marker according to the drawings in FIGS. 1(a) and 1(b). Samples of film were fixed to the Mylar template using ¾" binder clips and the film samples were each labeled according to their identifying formula.

Non-powdered moisture barrier gloves were used when handling the film samples to mitigate moisture contamination of the film samples. Moisture contamination may cause unnatural cloudiness in the film. The films were cast to a nominal 2.0 mil gauge. The samples were cast in ambient conditions and initial data was measured in the ambient environment prior to placement in the testing environment of nominally 23 ° C.+/−3 ° C. (73 ° F.+/−5 ° F.), and 50% RH +/−5% RH. For conditioning of the film, the ¾" binder clips holding the test sample were clipped to a coat hanger using 1-¼" binder clips and hung from a the coat hanger in the specified conditioning environment. Film was mixed on a Monday, cast on a Tuesday, and hung in set environment on Wednesday (t=0). Film was measured every Monday, Wednesday, and Friday (t=0, 2, 5, 7, 9, 12, 14, 16, 19, 21, 23, 26, 28, 30) until 30 days of measurement and observation was achieved.

The colorimeter was set to: number of average readings N =2, Lab, SPIN, and illuminant of D65/10. The Opacity test was selected from the spectrophotometer menu. A double Mylar standard (two plies of 4.75 mil Mylar film over white portion of a Leneta chart 7-⅝"×10¼" 2C B#42201) was loaded into the spectrophotometer. For each of the five spots designated on the film sample swatch, a piece of Mylar film was selected for backing and clipped to the back of the sample being measured. The sample was placed over the black portion of the Leneta chart. When the sample was flat against the Leneta chart and the sample itself was flat between the front and back sheets of Mylar, two sample measurements were taken. The sample was moved to the white portion of the Leneta chart and when the sample was flat against the Leneta chart and flat between the two sheets of Mylar, two samples measurements were taken. A reading of the white portion of the Leneta chart, without the samples. For each measurement, the % Opacity, L, a, b, and E values that were displayed on the screen were recorded. After measurement, the samples were returned to the conditioning environment. The film opacity is reported as the number of days the Δ% Opacity was 2% or less, i.e., the number of days the difference in opacity between the tested film and the t=0 film was 2% or less.

Tear Strength Measurements

This method covers the determination of the average force in grams per mil of specimen thickness required to propagate tearing through a specified length of polyvinyl alcohol (PVOH) film. The force in grams required to propagate tearing across a film is measured using a precisely calibrated pendulum device. Acting by gravity, the pendulum swings through an arc, tearing the specimen from a pre-cut slit. The specimen is held stationary on one side and on the other is fixed to the pendulum. The loss of energy of the pendulum swing is indicated by a pointer on a scale. The scale indication is a function of the force required to tear the specimen. This method is of value in ranking relative tearing resistance of PVOH films. The water-soluble films were evaluated on an Elmendorf Tearing Tester Model # 40043, in accordance with MSTM 107RD Standard Test Method for Propagation Tear Resistance of Polyvinyl Alcohol Film.

Various sugar alcohols were added to polyvinyl alcohol formulations and cast at nominally 2.0 mil thicknesses. These experiments were performed with and without carboxymethyl cellulose (CMC). The water-soluble films were conditioned at a temperature of about 23 ° C.+/−3 ° C. (73° F.+/−5° F.) and relative humidity of about 35% ±5% for not less than 8 hours prior to the test. The tests were conducted in the standard laboratory atmosphere of a temperature of 23° C.+/−3° C. (73° F.+/−5° F.) and a relative humidity of 35% ±5%. The average tearing force in grams-force per MIL was calculated as follows:

$$\text{Tearing force, g/mil} = \frac{(\text{Augmenting Weight g}/100) \times \text{scale reading}}{\text{Film thickness is MIL}}$$

Solubility Measurements

Various sugar alcohols were added to polyvinyl alcohol formulations and cast at nominally 2.0 mil thicknesses. Test specimens were cut from film samples (i.e., about 3.8 cm×3.2 cm specimen). If cut from a film web, specimen was cut from areas of web approximately evenly spaced along the transverse direction of the web. Each specimen was locked in a separate 35 mm slide mount.

For each specimen, a beaker was filled with 500 mL of distilled water. The water temperature was measured with a thermometer and, if necessary, heated or cooled to maintain temperature at 10 ° C. or 23° C. The height of column of water was marked, and a magnetic stirring rod was added to the beaker. The stir speed was adjusted until a vortex approximately one-fifth the height of the water column developed. The depth of the vortex was marked.

The 35 mm slide mount was secured to a 35 mm slide mount holder such that the long end of the slide mount was parallel to the water surface. The depth adjuster of the holder was set so that when dropped, the end of the clamp was 0.6 cm below the surface of the water. One of the short sides of the slide mount was positioned next to the side of the beaker with the other positioned directly over the center of the stirring rod such that the film surface was perpendicular to the flow of the water.

In one motion, the secured slide was dropped and clamped into the water and the timer was started. Disintegration occurred when the film broke apart. When all visible film was released from the slide mount, the slide was raised out of the water while the solution was monitored for undissolved film fragments. Dissolution occurred when all film fragments were no longer visible and the solution became clear.

Tensile Strength Measurements

Various sugar alcohols were added to polyvinyl alcohol formulations and cast at nominally 2.0 mil thickness. Samples were about 1.0 inches (2.5 cm) wide and about 3 inches (7.6 cm) long with the long dimension in the machine (casting) direction. The tests were conducted in the standard laboratory atmosphere of a temperature of 23° C.+/−3° C. (73° F.+/−5° F.) and a relative humidity of 35%±5%. The ultimate tensile strength was measured utilizing the ASTM D 882, "Standard Test Method for Tensile Properties of Thin Plastic Sheeting." The test was conducted on a Model 5543 Instron® Tensile Tester in a laboratory after aging at least about 12 hours. Without intending to be bound by any particular theory, it is believed that the Instron® grips utilized in the test may affect the test results. Consequently, the test was conducted utilizing Instron® grips having model number 2702-032 faces, which are rubber coated and 25 mm wide. Values were obtained directly from the Instron® Bluehill software version 2.25.796.

Elongation at Break Measurements

Various sugar alcohols were added to polyvinyl alcohol formulations and cast at nominally 2.0 mil thickness. Samples were about 1.0 inches wide and at least about 3 inches long with the long dimension in the machine (casting) direction. The tests were conducted in the standard laboratory atmosphere of a temperature of 23° C.+/−3° C. (73° F.+/−5° F.) and a relative humidity of 35%±5%. The elongation to break of a film was measured utilizing the ASTM D 882, "Standard Test Method for Tensile Properties of Thin Plastic Sheeting." The test was conducted on a Model 5543 Instron® Tensile Tester in a laboratory conditioned after aging at least about 12 hours. Without intending to be bound by any particular theory, it is believed that the Instron® grips utilized in the test may affect the test results. Consequently, the test was conducted utilizing Instron® grips having model number 2702-032 faces, which are rubber coated and 25 mm wide. Values were used directly from the Instron® Bluehill software version 2.25.796.

Energy to Break Measurements

Various sugar alcohols were added to polyvinyl alcohol formulations and cast at nominally 2.0 mil thickness. Samples were about 1.0 inches wide and about 3 inches long with the long dimension in the machine (casting) direction. The tests were conducted in the standard laboratory atmosphere of a temperature of 23° C.+/−3° C. (73° F.+/−5° F.) and a relative humidity of 35% ±5%. The energy to break of a film at was measured utilizing the ASTM D 882, "Standard Test Method for Tensile Properties of Thin Plastic Sheeting." The test was conducted on a Model 5543 Instron® Tensile Tester in a laboratory after aging at least about 12 hours. Without intending to be bound by any particular theory, it is believed that the Instron® grips utilized in the test may affect the test results. Consequently, the test was conducted utilizing Instron® grips having model number 2702-032 faces, which are rubber coated and 25 mm wide. Values were used directly from the Instron® Bluehill software version 2.25.796 for the Energy/Area methodology.

Heat Seal Measurements

Various sugar alcohols were added to polyvinyl alcohol formulations and cast at nominally 1.5 mil thickness. Samples were about 1.0 inches (2.5 cm) wide and about 3 inches (7.6 cm) long with the long dimension in the machine (casting) direction. The tests were conducted in the standard laboratory atmosphere of a temperature of 23° C.+/−3° C. (73° F.+/−5° F.) and a relative humidity of 35% ±5%. The peak load for tensile mode failure for the samples was determined (i.e., the film peak load) on a Model 5543 Instron® Tensile Tester. Samples were then heat sealed at a series of temperatures at 22 psi (152 kPa) and a dwell time of 1 second in a TS-12 Heat Sealer available from Lako Tool & Manufacturing, Inc of Perrysburg, OH. At temperatures below about 275° F. (135° C.) the seals were found to peel apart without the film tearing during hand inspection. At temperatures above 300° F. (149° C.) the films began to turn brown and bubbling occurred, indicating the onset of degradation. Therefore, a temperature ladder from 275° F. to 300° F. (135° C. to 149° C.)in 5° F. (about 3° C.) increments was conducted. The sealed films for each temperature setting were then tested in the tensile mode on a Model 5543 Instron® Tensile Tester and the seal peak load was recorded. The ratio of the seal peak load divided by the film peak load was reported as the peak load ratio.

Example 1

A set of water-soluble films were prepared with the ingredients identified below in the amounts shown (phr).

| Component | Description | 1 | 2 | 3 | 4 | 5 | 6 |
|---|---|---|---|---|---|---|---|
| PVOH | 8 cps, 88% DH | 100 | 100 | 100 | 100 | 100 | 100 |
| Xylitol | Sugar alcohol plasticizer solid at RT | 0.00 | 11.10 | 22.22 | 33.33 | 44.45 | 0.00 |
| CMC 1 | Compatibilizing agent | 44.45 | 33.33 | 22.22 | 11.10 | 0.00 | 0.00 |
| Sorbitol | Sugar alcohol plasticizer solid at RT | 7.90 | 7.90 | 7.90 | 7.90 | 7.90 | 5.47 |
| Glycerol, Propylene Glycol | Liquid plasticizer | 63.95 | 63.95 | 63.95 | 63.95 | 63.95 | 44.27 |
| Process Aids | surfactant | 2.54 | 2.54 | 2.54 | 2.54 | 2.54 | 1.76 |
| CMC 1 | Carboxymethyl cellulose characterized by a 2% solution viscosity at 25° C. of 25-50 cP and a degree of substitution of 0.65 to 0.90 | | | | | | |

Water-soluble films 1-5 were each comprised of 45 wt % PVOH, based on the total weight of the film. 20 wt % of the films were comprised of a combination of CMC and xylitol. Water-soluble film 6 contained 65 wt % PVOH with no CMC or xylitol, as a control film. The relative amounts of CMC and xylitol were varied over films 1-5. 2.0 mil thick water-soluble films were cast according to formulae 1-5, conditioned for 24 hours, and were tested for tear strength, solubility, tensile strength, elongation at break, and energy to break, as described above. The results are reproduced in the table below.

| Property | 1 | 2 | 3 | 4 | 5 | 6 |
|---|---|---|---|---|---|---|
| Tear Strength MD (g/mil) | 8 | 634 | 413 | 137 | 217 | 1341 |
| Dissolution at 10° C. (s) | 20.9 | 16.6 | 20.7 | 25.7 | 14.9 | 26.4 |
| Dissolution at 23° C. (s) | 17.4 | 8.7 | 16.9 | 18.2 | 10.1 | 17.9 |
| Tensile Strength (N/mm$^2$) | 17.5 | 10.9 | 13.1 | 15.7 | 8.5 | 18.2 |
| Elongation at break (%) | 118.4 | 600.4 | 430.8 | 419.6 | 550.2 | 535.6 |
| Energy to break (J/mm$^2$) | 0.4 | 1.1 | 1.0 | 1.2 | 0.9 | 1.5 |

FIG. 2 is a plot of the tear strengths vs. the wt % xylitol included in the water-soluble films. FIG. 3 is a plot of dissolution times vs. the wt % xylitol included in the water-soluble films. FIG. 4 is a contour plot of the tear strengths of PVOH based water-soluble films with different loadings of CMC and xylitol. As expected, the water-soluble film containing PVOH and CMC with no xylitol, film 1, was found to be brittle and dissolve relatively slowly at 23° C., relative to the control film 6. This film did show some improved dissolution properties at 10° C. Film 5, the other extreme, containing PVOH and xylitol with no CMC also was found to have decreased tear strength relative to the control film 6, and increased rate of dissolution, as expected. Unexpectedly, when the CMC and xylitol were both included, in a ratio of about 3:1 respectively (film 2), the tear strength was found to be higher than the tear strength of either film 1 or film 5; however as expected, the tear strength was still less than that of the control film 6. Also surprisingly, film 2 had the fastest rate of dissolution out of all the films except the xylitol-only film (film 5), which had similar rates of dissolution. This is unexpected because in film 2, CMC is the major component of the CMC/xylitol mixture, and the rate of dissolution would be expected to decrease, that is a film of given thickness would be expected to take longer to dissolve with the higher level of CMC.

Example 2

A set of water-soluble films were prepared with the ingredients identified below in the amounts shown (phr).

| Component | Description | 7 | 8 |
|---|---|---|---|
| PVOH | 8 cps, 88% DH M$_w$ about 67,000 | 100 | 0 |
| PVOH | 23 cps, 88% DH M$_w$ about 160,000 | 0 | 100 |
| Sorbitol | Sugar alcohol plasticizer solid at RT | 10.00 | 10.00 |
| Glycerol, Propylene Glycol | Liquid Plasticizer | 31.30 | 31.30 |
| Process Aids | Surfactant | 1.20 | 1.20 |

2.0 mil thick water-soluble films were cast according to formulae 7 and 8, were conditioned for 24 hours, and the transparency behavior of the water-soluble films was monitored. The water-soluble film containing the low molecular weight polyvinyl alcohol, film 7, maintained a Δ% Opacity of 2.0% or less for less than 9 days. In contrast, the water-soluble film containing the high molecular weight polyvinyl alcohol, film 8, only maintained a Δ% Opacity of 2.0% or less for less than 2 days.

Example 3

A set of water-soluble films were prepared with the ingredients identified below in the amounts shown (phr).

| Component | Description | 9 | 10 | 11 | 12 | 13 | 14 |
|---|---|---|---|---|---|---|---|
| PVOH | 8 cps 88% DH | 100 | 100 | 100 | 100 | 100 | 100 |
| CMC 2 | Compatibilizing agent | 18.13 | 0 | 18.13 | 0 | 18.13 | 0 |
| Sorbitol | Sugar alcohol plasticizer solid at RT | 10.00 | 10.00 | 20.00 | 20.00 | 30.00 | 30.00 |
| Glycerol, Propylene Glycol | Liquid Plasticizer | 36.98 | 31.30 | 36.98 | 31.30 | 36.98 | 31.30 |

-continued

| Component | Description | 9 | 10 | 11 | 12 | 13 | 14 |
|---|---|---|---|---|---|---|---|
| Process Aid | Surfactant | 1.42 | 1.20 | 1.42 | 1.20 | 1.42 | 1.20 |
| CMC 2 | Carboxymethyl cellulose characterized by a 2% solution viscosity of 20 to 50 cP at 25° C. and a degree of substitution of 0.70 to 0.85 | | | | | | |

2.0 mil thick water-soluble films were cast according to formulae 9-14, conditioned for 24 hours, and the transparency behavior of the water-soluble films was monitored. The number of days until a film had a Δ% Opacity of greater than 2% was recorded. The results are reproduced in the table below.

| | 9 | 10 | 11 | 12 | 13 | 14 |
|---|---|---|---|---|---|---|
| Sorbitol loading (phr) | 10.00 | 10.00 | 20.00 | 20.00 | 30.00 | 30.00 |
| CMC included | Yes | No | Yes | No | Yes | No |
| Days until Δ% Opacity is greater than 2.0 | 30 days | 9 days | 30 days | 7 days | 30 days | 5 days |

The water-soluble films that contained CMC, films 9, 11 and 13 maintained substantial transparency for at least 30 days. However, films 10, 12, and 14 that did not contain CMC became more opaque quickly. As the loading of sorbitol increased the films without CMC became more opaque at increasingly faster rates. At a sorbitol loading of 10 phr the film (film 10) without CMC remained substantially transparent less than 9 days. At a sorbitol loading of 20 phr the film (film 12) remained substantially transparent for less than 7 days, and when the sorbitol loading was increased further, to 30 phr, the film (film 14) turned opaque much more quickly, after less than 4 days. When CMC was present in the films, the film containing 10 phr sorbitol (film 9), the film containing 20 phr sorbitol (film 11) and the film containing 30 phr sorbitol (film 13) remained substantially transparent for at least 30 days. Water-soluble films that contained sorbitol demonstrated poor transparency without CMC at even low sorbitol loadings, and the performance was improved with the introduction of CMC into the film, especially at high sorbitol loadings.

Example 4

A set of water-soluble films were prepared with the ingredients identified below in the amounts shown (phr).

| Component | Description | 15 | 16 | 17 | 18 | 19 | 20 |
|---|---|---|---|---|---|---|---|
| PVOH | 8 cps, 88% DH | 100 | 100 | 100 | 100 | 100 | 100 |
| CMC 2 | Compatibilizing agent | 18.13 | 0 | 18.13 | 0 | 18.13 | 0 |
| Maltitol | Sugar alcohol plasticizer solid at RT | 10.00 | 10.00 | 20.00 | 20.00 | 30.00 | 30.00 |
| Glycerol, Propylene Glycol | Liquid Plasticizer | 36.98 | 31.30 | 36.98 | 31.30 | 36.98 | 31.30 |
| Process Aid | Surfactant | 1.42 | 1.20 | 1.42 | 1.20 | 1.42 | 1.20 |

2.0 mil thick water-soluble films were cast according to formulae 15-20, conditioned for 24 hours, and the transparency behavior of the water-soluble films was monitored. The number of days until a film had a Δ% Opacity of greater than 2% was recorded. The results are reproduced in the table below.

| | 15 | 16 | 17 | 18 | 19 | 20 |
|---|---|---|---|---|---|---|
| Maltitol loading (phr) | 10.00 | 10.00 | 20.00 | 20.00 | 30.00 | 30.00 |
| CMC included | Yes | No | Yes | No | Yes | No |
| Days until Δ% Opacity is greater than 2.0 | 30 days | 5 days | 28 days | 2 days | 21 days | 2 days |

The water-soluble films that contained 10, phr of maltitol and no CMC, film 16, remained substantially transparent for only 5 days. When the maltitol loading was increased further to 20 and 30 phr, films 18 and 20, the films became opaque much more quickly, after less than 2 days. However, the films that contained CMC remained substantially transparent for up to 30 days when the maltitol loading was 10, 28 days when the maltitol loading was 20 phr and 21 days when the maltitol loading was 30 phr. Although maltitol is a disaccharide consisting of a linear and a cyclic unit, films that included maltitol had similar transparency properties as films that included the linear monosaccharide, sorbitol. As in the case with sorbitol, Example 3, the inclusion of CMC in the films that included maltitol resulted in an increase in the number of days that the films remained substantially transparent.

Comparative Example 5

A set of water-soluble films were prepared with the ingredients identified below in the amounts shown (phr).

| Component | Description | 21 | 22 | 23 | 24 | 25 | 26 |
|---|---|---|---|---|---|---|---|
| PVOH | 8 cps, 88% DH | 100 | 100 | 100 | 100 | 100 | 100 |
| CMC 2 | Compatibilizing agent | 18.13 | 0 | 18.13 | 0 | 18.13 | 0 |
| Mannitol | Sugar alcohol plasticizer solid at RT | 10.00 | 10.00 | 20.00 | 20.00 | 30.00 | 30.00 |
| Glycerol, Propylene Glycol | Liquid Plasticizer | 36.98 | 31.3 | 36.98 | 31.3 | 36.98 | 31.3 |
| Process Aid | Surfactant | 1.42 | 1.20 | 1.42 | 1.20 | 1.42 | 1.20 |

2.0 mil thick water-soluble films were cast according to formulae 21-26, conditioned for 24 hours, and the transparency behavior of the water-soluble films was monitored. The number of days until a film had a Δ% Opacity of greater than 2% was recorded. The results are reproduced in the table below.

|  | 21 | 22 | 23 | 24 | 25 | 26 |
|---|---|---|---|---|---|---|
| Mannitol loading (phr) | 10.00 | 10.00 | 20.00 | 20.00 | 30.00 | 30.00 |
| CMC included | Yes | No | Yes | No | Yes | No |
| Days until Δ% Opacity is greater than 2. | 9 days | 2 days | 2 days | 2 days | 2 days | 2 days |

Mannitol, (2R,3R,4R,5R)-hexan-1,2,3,4,5,6-hexol, is a stereoisomer of sorbitol, (2S,3R,4R,5R)-hexan-1,2,3,4,5,6-hexol. However, unlike the water-soluble films that included sorbitol (Example 3), water-soluble films that included mannitol only remained substantially transparent for 9 days, regardless of the loading level of mannitol, or the inclusion of CMC. Although mannitol and sorbitol are both six carbon, linear sugars of equal molecular weight, the heats of fusion of the two sugar alcohol plasticizers that are solids at room temperature are not similar. Sorbitol has a heat of fusion of 192 J/g and mannitol has a heat of fusion of 301 J/g.

Example 6

A set of water-soluble films were prepared with the ingredients identified below in the amounts shown (phr).

| Component | Description | 27 | 28 | 29 | 30 | 31 | 32 |
|---|---|---|---|---|---|---|---|
| PVOH | 8 cps, 88% DH | 100 | 100 | 100 | 100 | 100 | 100 |
| CMC 2 | Compatibilizing agent | 18.13 | 0 | 18.13 | 0 | 18.13 | 0 |
| Xylitol | Sugar alcohol plasticizer solid at RT | 10.00 | 10.00 | 20.00 | 20.00 | 30.00 | 30.00 |
| Glycerol, Propylene Glycol | Liquid plasticizer | 36.98 | 31.3 | 36.98 | 31.3 | 36.98 | 31.3 |
| Process Aid | Surfactant | 1.42 | 1.20 | 1.42 | 1.20 | 1.42 | 1.20 |

2.0 mil thick water-soluble films were cast according to formulae 27-32, conditioned for 24 hours, and the transparency behavior of the water-soluble films was monitored. The number of days until a film had a Δ% Opacity of greater than 2% was recorded. The results are reproduced in the table below.

|  | 27 | 28 | 29 | 30 | 31 | 32 |
|---|---|---|---|---|---|---|
| Xylitol loading (phr) | 10.00 | 10.00 | 20.00 | 20.00 | 30.00 | 30.00 |
| CMC included | Yes | No | Yes | No | Yes | No |
| Days until Δ% Opacity is greater than 2. | 30 days | 26 days | 30 days | 2 days | 14 days | 2 days |

The water-soluble film that contained 10 phr of xylitol and no CMC, film 28, remained substantially transparent for 26 days. When the xylitol loading was increased to 20 or 30 phr, films 30 and 32, the films became opaque much more quickly, after 2 days. However, the films that included CMC were substantially transparent for up to 30 days, 30 days and 14 days at xylitol loadings of 10, 20, and 30 phr, respectively. Although xylitol is a five carbon sugar alcohol plasticizer, the water-soluble films that include xylitol behaved similar to the water-soluble films that contained the six carbon sugar alcohol plasticizer, sorbitol. As in the case with sorbitol, Example 3, the inclusion of CMC in the films that included xylitol resulted in an increase in the number of days that the films remained substantially transparent.

Example 7

An edible water-soluble film was prepared with the ingredients identified below in the amounts shown (phr).

| Component | Description | 33 |
|---|---|---|
| PVOH | 8 cps, 88% DH | 100 |
| CMC 2 | Compatibilizing agent | 17.04 |
| Xylitol | Sugar alcohol plasticizer solid at RT | 8.52 |

| Component | Description | 33 |
| --- | --- | --- |
| Sorbitol | Sugar alcohol plasticizer solid at RT | 4.57 |
| Glycerol, Propylene glycol | Liquid Plasticizer | 36.98 |
| Process aid | Surfactant | 1.43 |

2.0 mil thick water-soluble films were cast according to formula 33, conditioned for 24 hours, and were tested for tear strength, solubility, tensile strength, elongation at break, and energy to break as described above. The results are reproduced in the table below.

| Property | 33 |
| --- | --- |
| Tear Strength MD (g/mil) | 51 |
| Dissolution at 10° C. (s) | 46.5 |
| Dissolution at 23° C. (s) | 22.8 |
| Tensile Strength (N/mm$^2$) | 21.3 |
| Elongation at break (%) | 467.3 |
| Energy to break (J/mm$^2$) | 1.7 |

Example 7 demonstrates an edible water soluble film according to the invention that has good dissolution time, tensile strength, elongation at break and energy to break. Example 7 includes a cellulose ether as a compatibilizing agent.

Example 8

An edible water-soluble film was prepared with the ingredients identified below in the amounts shown (phr).

| Component | Description | 34 |
| --- | --- | --- |
| PVOH | 8 cps, 88% DH | 100 |
| Modified Starch Pure Cote B790 | Compatibilizing agent | 17.04 |
| Xylitol | Sugar alcohol plasticizer, solid at RT | 8.52 |
| Sorbitol | Sugar alcohol plasticizer, solid at RT | 4.57 |
| Glycerol, Propylene Glycol | Liquid Plasticizer | 36.98 |
| Process Aid | Surfactant | 1.35 |

2.0 mil thick water-soluble films were cast according to formula 34, conditioned for 24 hours, and were tested for tear strength, solubility, tensile strength, elongation at break, and energy to break as described above. The results are reproduced in the table below.

| Property | 34 |
| --- | --- |
| Tear Strength MD (g/mil) | 869 |
| Dissolution at 10° C. (s) | 69.9 |
| Dissolution at 23° C. (s) | 31.4 |
| Tensile Strength (N/mm$^2$) | 19.6 |
| Elongation at break (%) | 497.7 |
| Energy to break (J/mm$^2$) | 1.5 |

Example 8, like Example 7, demonstrates an edible water soluble film according to the invention that has good dissolution time, tensile strength, elongation at break and energy to break. Example 8 includes a modified starch as a compatibilizing agent.

Example 9

A water-soluble film was prepared with the ingredients identified below in the amounts shown (phr).

| Component | Description | 35 |
| --- | --- | --- |
| PVOH | 8 cps, 88% DH | 100 |
| CMC 2 | Compatibilizing agent | 18.13 |
| Xylitol | Sugar alcohol plasticizer, solid at RT | 18.13 |
| Sorbitol | Sugar alcohol plasticizer, solid at RT | 4.57 |
| Glycerol, Propylene Glycol | Liquid Plasticizer | 36.98 |
| Process Aid | Surfactant | 1.46 |

Water-soluble packets were made from the water-soluble film according to formula 35. The water-soluble film of the packets had an average thickness of 1.52 mils. Oatmeal was enclosed within the packets. The compatibility of the packets with the oatmeal was tested under three test atmospheres for 42 days. The packets were inserted into high density polyethylene (HDPE) jars and capped, and subjected to one of either: ambient temperature and humidity (about 23° C. and about 30 to 50% relative humidity (RH)); 38° C. and about 80% RH; or 38° C. and about 10% RH.

After 42 days, the exposed packets were tested against unexposed film of formula 35. Inspection of the exposed packets revealed no visible film or product discoloration, or packet adhesiveness when stored in HDPE jars. Flexibility appeared unchanged. Solubility tests were conducted and no increased time was required for complete solubility as a result of product storage within test environments. The elongation values of the packets were tested against unexposed film. Under all test environments, the elongation values of the packets were slightly reduced when compared to the unexposed film. The results are reproduced in the table below.

| | Elongation at Break (%) | Complete Dissolution Time (s) At 30° C. and 1.5 mils thick |
| --- | --- | --- |
| Unexposed | 528 | 15 |
| 42 days @ 23° C., 30 to 50% RH | 384 | 14 |
| 42 days @ 38° C., 80% RH | 369 | 15 |
| 42 days @ 38° C., 10% RH | 339 | 16 |

Example 10

A water-soluble film was prepared with the ingredients identified below in the amounts shown (phr).

| Component | Description | 36 | 15 | 9 | 37 | 27 | 38 | 39 | 40 | 21 |
|---|---|---|---|---|---|---|---|---|---|---|
| PVOH | 8 cps 88% DH | 100 | 100 | 100 | 100 | 100 | 100 | 100 | 100 | 100 |
| CMC 2 | Compatibilizing agent | 18.13 | 18.13 | 18.13 | 18.13 | 18.13 | 18.13 | 18.13 | 18.13 | 18.13 |
| Variable (See the table below) | Sugar alcohol plasticizer solid at RT | 10.00 | 10.00 | 10.00 | 10.00 | 10.00 | 10.00 | 10.00 | 10.00 | 10.00 |
| Glycerol, Propylene Glycol | Liquid Plasticizer | 36.98 | 36.98 | 36.98 | 36.98 | 36.98 | 36.98 | 36.98 | 36.98 | 36.98 |
| Process Aid | Surfactant | 1.42 | 1.42 | 1.42 | 1.42 | 1.42 | 1.42 | 1.42 | 1.42 | 1.42 |

2.0 mil thick water-soluble films were cast according to formulae 36, 15, 9, 37, 27, 38-40, and 21, conditioned for 24 hours, and the transparency behavior of the water-soluble films was monitored. The transparency of the films was monitored for 30 days with exception of erythritol (formula 39), 26 days, and mannitol (formula 21), 21 days. The results are reproduced in the table below.

| Formulae | Sugar Alcohol | Sugar Alcohol Loading (phr) | Opacity at 30 days | Heat of Fusion (J/g) |
|---|---|---|---|---|
| 36 | Isomalt | 10 | 35.8 | 142 |
| 15 | Maltitol | 10 | 35.8 | 164 |
| 9 | Sorbitol | 10 | 35.9 | 192 |
| 37 | Adonitol | 10 | 36.3 | 232 |
| 27 | Xylitol | 10 | 36.5 | 247 |
| 38 | Dulcitol | 10 | 37.2 | 340 |
| 39 | Erythritol | 10 | 37.9 | 329 |
| 40 | Pentaerythritol | 10 | 38.6 | 289 |
| 21 | Mannitol | 10 | 39.2 | 301 |

Films according to formulae 38, 39, 40, and 21 having the described amounts of dulcitol, erythritol, pentaerythritol or mannitol as the sugar alcohol plasticizer that is a solid at room temperature demonstrated an undesirable cloudiness. In contrast, films according to formulae 36, 15, 9, 37, and 27 comprising isomalt, maltitol, sorbitol, or adonitol as a sugar alcohol plasticizer that is solid at room temperature demonstrated an acceptable level of transparency. The undesirable films had opacity values of 37.2% or greater while the desirable films had opacity levels of 36.6% or less. Example 10 shows that in films comprising 10 phr of the sugar alcohol plasticizer that is a solid at room temperature, films wherein the sugar alcohol plasticizer had a heat of fusion of about 247 J/g or less were acceptably transparent and films wherein the sugar alcohol plasticizer had a heat of fusion of about 289 J/g or greater at these loading rates had unacceptable cloudiness.

Example 11

A water-soluble film was prepared with the ingredients identified below in the amounts shown (phr).

| Component | Description | 11 | 41 | 29 | 42 | 43 | 17 | 23 | 44 | 45 |
|---|---|---|---|---|---|---|---|---|---|---|
| PVOH | 8 cps 88% DH | 100 | 100 | 100 | 100 | 100 | 100 | 100 | 100 | 100 |
| CMC 2 | Compatibilizing agent | 18.13 | 18.13 | 18.13 | 18.13 | 18.13 | 18.13 | 18.13 | 18.13 | 18.13 |
| Variable (See the table below) | Sugar alcohol plasticizer solid at RT | 20.00 | 20.00 | 20.00 | 20.00 | 20.00 | 20.00 | 20.00 | 20.00 | 20.00 |
| Glycerol, Propylene Glycol | Liquid Plasticizer | 36.98 | 36.98 | 36.98 | 36.98 | 36.98 | 36.98 | 36.98 | 36.98 | 36.98 |
| Process Aid | Surfactant | 1.42 | 1.42 | 1.42 | 1.42 | 1.42 | 1.42 | 1.42 | 1.42 | 1.42 |

2.0 mil thick water-soluble films were cast according to formulae 11, 41, 29, 42, 43, 17, 23, 44, and 45, conditioned for 24 hours, and the transparency behavior of the water-soluble films was monitored. The transparency of the films was monitored for 30 days with exception of erythritol (formula 44), 26 days, and mannitol (formula 23), 21 days. The results are reproduced in the table below.

| Formulae | Sugar Alcohol | Sugar Alcohol Loading (phr) | Opacity at 30 days | Heat of Fusion (J/g) |
|---|---|---|---|---|
| 11 | Sorbitol | 20 | 35.8 | 192 |
| 41 | Isomalt | 20 | 36.3 | 142 |
| 29 | Xylitol | 20 | 36.8 | 247 |
| 42 | Dulcitol | 20 | 37.4 | 340 |
| 43 | Pentaerythritol | 20 | 38.6 | 289 |
| 17 | Maltitol | 20 | 39.1 | 164 |
| 23 | Mannitol | 20 | 40.4 | 301 |
| 44 | Erythritol | 20 | 41.2 | 329 |
| 45 | Adonitol | 20 | 41.6 | 232 |

Films according to formulae 42, 43, 17, 23, 44, and 45 having the described amounts of dulcitol, pentaerythritol, maltitol, mannitol, erythritol, or adonitol as the sugar alcohol plasticizer that is a solid demonstrated an undesirable cloudy appearance. In contrast, films according to formulae 11, 41, and 29 comprising xylitol, isomalt or sorbitol as the sugar alcohol plasticizer that is a solid at room temperature demonstrated an acceptable level of transparency. The undesirable films had opacity values of 37.4% or greater while the desirable films had opacity levels of 36.8% or less. Example 11 shows that in films comprising 20 phr of the sugar alcohol plasticizer that is a solid at room temperature, films wherein the sugar alcohol plasticizer had a heat of fusion of about 247 J/g or less were acceptably transparent, with the exceptions of the films comprising sugar alcohol plasticizers that are a solid at room temperature with heats of fusion below 247 J/g but do not have two adjacent, sterically unhindered, hydroxyl groups in the same plane, maltitol and adonitol, the films being unacceptably cloudy. In contrast, films wherein the sugar alcohol plasticizer had a heat of fusion of about 289 J/g or greater at these loading rates were unacceptably cloudy in appearance.

Example 12

A water-soluble film was prepared with the ingredients identified below in the amounts shown (phr).

| Component | Description | 13 | 46 | 47 | 48 | 19 | 31 | 49 | 50 | 25 |
|---|---|---|---|---|---|---|---|---|---|---|
| PVOH | 8 cps 88% DH | 100 | 100 | 100 | 100 | 100 | 100 | 100 | 100 | 100 |
| CMC 2 | Compatibilizing agent | 18.13 | 18.13 | 18.13 | 18.13 | 18.13 | 18.13 | 18.13 | 18.13 | 18.13 |
| Variable (See the table below) | Sugar alcohol plasticizer solid at RT | 30.00 | 30.00 | 30.00 | 30.00 | 30.00 | 30.00 | 30.00 | 30.00 | 30.00 |
| Glycerol, Propylene Glycol | Liquid Plasticizer | 36.98 | 36.98 | 36.98 | 36.98 | 36.98 | 36.98 | 36.98 | 36.98 | 36.98 |
| Process Aid | Surfactant | 1.42 | 1.42 | 1.42 | 1.42 | 1.42 | 1.42 | 1.42 | 1.42 | 1.42 |

2.0 mil thick water-soluble films were cast according to formulae 13, 46, 47, 48, 19, 31, 49, 50, and 25, conditioned for 24 hours, and the transparency behavior of the water-soluble films was monitored. The transparency of the films was monitored for 30 days with exception of erythritol (formula 49), 26 days, and mannitol (formula 25), 21 days. The results are reproduced in the table below.

| Formulae | Sugar Alcohol | Sugar Alcohol Loading (PHR) | Opacity at 30 days | Heat of Fusion (J/g) |
|---|---|---|---|---|
| 13 | Sorbitol | 30 | 35.7 | 192 |
| 46 | Isomalt | 30 | 37.0 | 142 |
| 47 | Dulcitol | 30 | 37.3 | 340 |
| 48 | Pentaerythritol | 30 | 39.9 | 289 |
| 19 | Maltitol | 30 | 40.4 | 164 |
| 31 | Xylitol | 30 | 40.8 | 247 |
| 49 | Erythritol | 30 | 40.8 | 329 |
| 50 | Adonitol | 30 | 42.4 | 232 |
| 25 | Mannitol | 30 | 43.2 | 301 |

Films according to formulae 47, 48, 19, 31, 49, 50, and 25 having the described amounts of dulcitol, pentaerythritol, maltitol, xylitol, erythritol, adonitol or mannitol as the sugar alcohol plasticizer that is a solid demonstrated an undesirable cloudy appearance. In contrast, films according to formulae 13 and 46 comprising isomalt or sorbitol as the sugar alcohol plasticizer that is a solid at room temperature demonstrated an acceptable level of transparency. The undesirable films had opacity values of 37.3% or greater while the desirable films had opacity levels of 37.0% or less. Example 12 shows that in films comprising 30 phr of the sugar alcohol plasticizer that is a solid at room temperature, films wherein the sugar alcohol plasticizer had a heat of fusion of about 192 J/g or less were acceptably transparent, with the exception of the film comprising a sugar alcohol plasticizer that are a solid at room temperature with a heat of fusion below 192 J/g but does not have two adjacent, sterically unhindered, hydroxyl groups in the same plane, maltitol, the film being unacceptably cloudy. In contrast, films wherein the sugar alcohol plasticizer had a heat of fusion of about 232 J/g or greater at these loading rates were unacceptably cloudy in appearance.

Example 13

A water-soluble film was prepared with the ingredients identified below in the amounts shown (phr).

| Component | Description | 51 |
|---|---|---|
| PVOH | 23 cps, nominal 88% DH | 100 |
| CMC 3 | Compatibilizing agent | 17.04 |

-continued

| Component | Description | 51 |
|---|---|---|
| Xylitol | Sugar alcohol plasticizer solid at RT | 8.52 |
| Sorbitol | Sugar alcohol plasticizer solid at RT | 4.57 |
| Glycerol, Propylene Glycol | Liquid plasticizer | 36.98 |
| Process Aid | Surfactant | 1.43 |
| Process Aid | Antiblock | 2.6 |
| CMC 3 | Carboxymethyl cellulose characterized by a viscosity of 2% solution at 25° C. of 20-80 cP and a degree of substitution of 0.65-0.90 | |

2.0 mil thick water-soluble films were cast according to formula 51, conditioned for 24 hours, and were tested for tear strength, solubility, tensile strength, elongation at break, and energy to break, as described above. The results are reproduced in the table below.

| Property | 51 |
|---|---|
| Tear Strength MD (g/mil) | 1159 |
| Dissolution at 10° C. (s) | 27.7 |
| Dissolution at 23° C. (s) | 31.4 |
| Tensile Strength (N/mm$^2$) | 32.8 |
| Elongation at break (%) | 519.1 |
| Energy to break (J/mm$^2$) | 2.3 |

Example 13 shows that when additional processing aids for antiblocking were added that good tear, tensile and solubility properties and acceptable transparency as visually observed were achieved.

Example 14

A water-soluble film was prepared with the ingredients identified below in the amounts shown (phr).

| Component | Description | 52 |
|---|---|---|
| PVOH | 23 cps, nominal 88% DH | 100 |
| CMC 2 | Compatibilizing agent | 17.04 |

-continued

| Component | Description | 52 |
|---|---|---|
| Xylitol | Sugar alcohol plasticizer solid at RT | 8.52 |
| Sorbitol | Sugar alcohol plasticizer solid at RT | 6.53 |
| Glycerol, Propylene Glycol | Liquid plasticizer | 36.98 |
| Process Aid | Surfactant | 1.43 |

1.5 mil thick water-soluble films were cast according to formula 52, conditioned for 24 hours, and were tested for film peak load followed by seal peak load at different temperatures. The peak load ratio was determined. The results are reproduced in the table below.

| Heat Seal | Film Peak Load (N) | Seal Peak Load (N) | Peak Load Ratio |
|---|---|---|---|
| 275° F. (135° C.) | 19.92 | 6.19 | 0.31 |
| 280° F. (138° C.) | 19.92 | 6.72 | 0.34 |
| 285° F. (140.5° C.) | 19.92 | 7.16 | 0.36 |
| 290° F. (143° C.) | 19.92 | 6.21 | 0.31 |
| 295° F. (146° C.) | 19.92 | 7.12 | 0.36 |
| 300° F. (149° C.) | 19.92 | 8.37 | 0.42 |

Example 14 shows that acceptable peak load ratios are obtained for films that are heat sealed at a temperature in the range of 275° F. to 300° F. (135° C. to 149° C.).

What is claimed:

1. A water soluble film, consisting of a water soluble mixture of
   a water soluble resin comprising polyvinyl alcohol, a modified polyvinyl alcohol, or a combination thereof, wherein the polyvinyl alcohol or modified polyvinyl alcohol is present in an amount in a range of about 35 to about 90 wt. %, based on the total weight of the film,
   a compatibilizing agent selected from carboxymethyl cellulose (CMC), hydroxypropylated starch, and a combination thereof, a sugar alcohol plasticizer that is a solid at room temperature selected from the group consisting of isomalt, maltitol, sorbitol, xylitol, adonitol, and a combination thereof, and,
   optionally one or more excipients selected from the group consisting of a plasticizer that is a liquid at room temperature, a surfactant, an antiblocking agent, and an internal release agent,
   wherein the water soluble film is substantially transparent according to having an opacity of 37% or less for a 2.0 mm film, after storing for 30 days after film formation,
   wherein the sugar alcohol plasticizer that is a solid at room temperature has a heat of fusion of 247 J/g or less and a concentration of 5 to 35 phr, and when the heat of fusion of a sugar alcohol plasticizer that is a solid at room temperature is greater than 192J/g then its concentration is 20 phr or less; and
   wherein the water soluble polyvinyl alcohol or modified polyvinyl alcohol component of the film is characterized by a weight average molecular weight in a range of about 55,000 to about 80,000 g/mol.

2. The water soluble film of claim 1, wherein the sugar alcohol plasticizer that is a solid at room temperature is included in an amount of about 20phr or less.

3. The water soluble film of claim 1, wherein the sugar alcohol plasticizer that is a solid at room temperature is included in an amount of about 25 to about 35 phr and is characterized by a heat of fusion of about 192 J/g or less.

4. The water soluble film of claim 1,
   wherein the compatibilizing agent is carboxymethyl cellulose;
   wherein the sugar alcohol plasticizer that is a solid at room temperature comprises xylitol and a second sugar alcohol plasticizer that is a solid at room temperature; and
   wherein the water soluble film, when 2.0 mils thick, dissolves in less than 50 seconds in water at 23° C.

5. The water soluble film of claim 1, wherein the water soluble film has a tear strength of at least 400 g/mL.

6. The water soluble film of claim 4, wherein the ratio of compatibilizing agent to xylitol is about 3:1.

7. The water soluble film of claim 1, wherein the water soluble film is edible.

8. The water-soluble film of claim 1, wherein the water soluble resin comprises polyvinyl alcohol.

9. The water soluble film of claim 8, wherein the water soluble resin comprises polyvinyl alcohol with a degree of hydrolysis in a range of about 75% to about 99%.

10. The water soluble film of claim 1, wherein the sugar alcohol plasticizer that is a solid at room temperature is included in the film an amount in a range of about 10 to about 25 parts per hundred parts resin (phr).

11. The water soluble film of claim 10, wherein the sugar alcohol plasticizer that is a solid at room temperature comprises at least two sugar alcohol plasticizers that are solid at room temperature.

12. The water soluble film of claim 1, wherein the sugar alcohol plasticizer that is a solid at room temperature is characterized by a heat of fusion of less than about 192 J/g.

13. The water soluble film of claim 1, wherein the sugar alcohol plasticizer that is a solid at room temperature comprises a mixture of xylitol with at least one member of the group consisting of maltitol, sorbitol, and isomalt.

14. The water soluble film according to claim 1, wherein the compatibilizing agent is carboxymethyl cellulose.

15. The water soluble film according to claim 14, wherein the carboxymethyl cellulose has a degree of substitution in a range of about 0.6 to about 0.95.

16. The water soluble film of claim 1, wherein the compatibilizing agent is included in the film in an amount in a range of about 10 to about 25 phr.

17. The water soluble film of claim 1, wherein the ratio of compatibilizing agent to sugar alcohol plasticizer that is a solid at room temperature is about 2:1 to about 1:2.

18. The water soluble film of claim 1, comprising a plasticizer that is a liquid at room temperature selected from the group consisting of glycerol, diglycerol, propylene glycol, ethylene glycol, diethyleneglycol, triethylene glycol, tetraethyleneglycol, polyethylene glycols up to MW 400, 2 methyl 1,3 propane diol and combinations of the forgoing.

19. The water soluble film according to claim 18, wherein the plasticizer that is a liquid at room temperature is present in the film an amount in a range of about 25 to about 50 phr.

20. The water soluble film of claim 1, comprising a surfactant.

21. The water soluble film according to claim 20, wherein the surfactant is selected from the group consisting of dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations of any of the forgoing.

22. The water soluble film according to claim 21, wherein the surfactant is present in the film in an amount of less than about 2 phr.

23. The water soluble film of claim 1, wherein the film is heat sealable.

24. The water soluble film of claim 22, wherein the film is thermoformable.

25. The water soluble film of claim 1, wherein the film maintains a Δ% opacity of 2.0% or less for at least 4 days longer than an otherwise identical film having no compatibilizing agent.

26. An article, comprising a water soluble packet comprising a film of claim 1.

27. The article of claim 26, wherein the packet contains a food item.

28. The water soluble film of claim 1, comprising a water soluble mixture of
   polyvinyl alcohol, carboxymethylcellulose, xylitol, sorbitol, and glycerol;
   wherein the ratio of carboxymethylcellulose to xylitol is about 3:1.

29. The water-soluble film of claim 1, comprising one or more excipients selected from the group consisting of a plasticizer that is a liquid at room temperature, a surfactant, and an antiblocking agent.

* * * * *

UNITED STATES PATENT AND TRADEMARK OFFICE
CERTIFICATE OF CORRECTION

| | | |
|---|---|---|
| PATENT NO. | : 10,829,621 B2 | Page 1 of 1 |
| APPLICATION NO. | : 13/740053 | |
| DATED | : November 10, 2020 | |
| INVENTOR(S) | : David M. Lee et al. | |

It is certified that error appears in the above-identified patent and that said Letters Patent is hereby corrected as shown below:

In the Claims

At Column 29, Line 51, "2.0mm" should be --2.0 mil--.

Signed and Sealed this
Fifth Day of July, 2022

Katherine Kelly Vidal
*Director of the United States Patent and Trademark Office*